US012518817B2

(12) United States Patent
Lee et al.

(10) Patent No.: US 12,518,817 B2
(45) Date of Patent: Jan. 6, 2026

(54) MEMORY DEVICES HAVING SENSE AMPLIFIERS THEREIN THAT SUPPORT OFFSET COMPENSATION AND METHODS OF OPERATING SAME

(71) Applicant: Samsung Electronics Co., Ltd., Suwon-si (KR)

(72) Inventors: Dongil Lee, Suwon-si (KR); Younghun Seo, Suwon-si (KR); Sun Young Kim, Suwon-si (KR); Hoseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 18/298,999

(22) Filed: Apr. 11, 2023

(65) Prior Publication Data

US 2024/0029782 A1    Jan. 25, 2024

(30) Foreign Application Priority Data

Jul. 25, 2022  (KR) ........................ 10-2022-0091659
Sep. 27, 2022 (KR) ........................ 10-2022-0122699

(51) Int. Cl.
  *G11C 11/4091* (2006.01)
  *G11C 7/06* (2006.01)
  *G11C 11/4094* (2006.01)

(52) U.S. Cl.
  CPC .......... *G11C 11/4091* (2013.01); *G11C 7/065* (2013.01); *G11C 11/4094* (2013.01)

(58) Field of Classification Search
  CPC .. G11C 11/4091; G11C 11/4094; G11C 7/065
  See application file for complete search history.

(56) References Cited

U.S. PATENT DOCUMENTS 7,729,189 B2   6/2010 Forbes
9,431,071 B2   8/2016 Moon et al.
(Continued)

FOREIGN PATENT DOCUMENTS

CN  112712837 A   4/2021
KR  102234600 B1  4/2021

*Primary Examiner* — Alexander Sofocleous
*Assistant Examiner* — Joseph Fidelis Stormes
(74) *Attorney, Agent, or Firm* — Wolf, Greenfield & Sacks, P.C.

(57) ABSTRACT

A method of operating a bit line sense amplifier may include performing a normal precharge operation by charging a bit line, a complementary bit line, a sensing bit line, and a complementary sensing bit line to a precharge voltage, and then performing a first offset compensation operation by connecting the bit line to the sensing bit line, connecting the complementary bit line to the complementary sensing bit line, applying a first internal voltage greater than the precharge voltage to a P-type sense amplifier, and applying a second internal voltage less than the precharge voltage to an N-type sense amplifier. A second offset compensation operation is performed by applying the precharge voltage to the P-type sense amplifier concurrently with applying the second internal voltage to the N-type sense amplifier. A bit line offset detection operation is performed by separating the bit line from the sensing bit line, separating the complementary bit line from the complementary sensing bit line, connecting the sensing bit line to the complementary sensing bit line, and applying the precharge voltage to the N-type sense amplifier.

6 Claims, 17 Drawing Sheets

(56) References Cited

U.S. PATENT DOCUMENTS

| | | | |
|---|---|---|---|
| 10,224,093 B2 | 3/2019 | Kim et al. | |
| 11,024,364 B2 | 6/2021 | Seo et al. | |
| 2018/0233192 A1* | 8/2018 | Won | G11C 11/4074 |
| 2021/0407557 A1 | 12/2021 | Shang et al. | |
| 2022/0076732 A1 | 3/2022 | Kang et al. | |
| 2022/0310134 A1* | 9/2022 | Su | G11C 11/4091 |
| 2023/0238052 A1* | 7/2023 | Shang | G11C 7/12 |
| | | | 365/149 |
| 2024/0203474 A1* | 6/2024 | Vogelsang | G11C 11/4094 |

* cited by examiner

MEMORY DEVICES HAVING SENSE AMPLIFIERS THEREIN THAT SUPPORT OFFSET COMPENSATION AND METHODS OF OPERATING SAME

REFERENCE TO PRIORITY APPLICATIONS

This application claims priority under 35 U.S.C. § 119 to Korean Patent Application No. 10-2022-0091659, filed Jul. 25, 2022, and Korean Patent Application No. 10-2022-0122699, filed Sep. 27, 2022, the disclosures of which are hereby incorporated herein by reference.

BACKGROUND

Embodiments of the present disclosure relate to integrated circuit devices and methods of operating same and, more particularly, to integrated circuit memory devices having sense amplifiers therein and methods of operating sense amplifiers.

Semiconductor memory devices may be classified as volatile memory devices or non-volatile memory devices. A volatile memory device (e.g., a DRAM or an SRAM) typically has a high read/write speed, but data stored therein is erased when power is removed from the volatile memory. In contrast, a non-volatile memory device can retain data stored therein even when power thereto is interrupted.

A representative example of a volatile memory is a dynamic random access memory (DRAM). A memory cell of the volatile memory device (e.g., a DRAM) may include one NMOS transistor serving as a switch and one capacitor storing electric charges (data). The binary information "1" or "0" may correspond to the presence or absence of electric charges stored in the capacitor in the memory cell. The memory cell may be connected to a word line and a bit line, and the bit line may be connected to a sense amplifier. The sense amplifier may sense data stored in the memory cell through the bit line, in response to a voltage applied to the word line.

The memory cells of the volatile memory may be connected to a bit line and a complementary bit line. In the volatile memory, when a read operation or a refresh operation is performed, the bit line sense amplifier may sense and amplify a voltage difference between the bit line and the complementary bit line. The semiconductor elements within the bit line sense amplifier may have different characteristics, including different threshold voltages between devices due to process, voltage and temperature (PVT) variations. Because of this, a gain change of the bit line sense amplifier may occur and the sensing characteristic distribution may be widened. When the sensing characteristic distribution of the bit line sense amplifier is widened, the timing performance of the volatile memory may deteriorate.

SUMMARY

Embodiments of the present disclosure provide a memory device that efficiently performs an offset compensation of a bit line sense amplifier using a hybrid offset compensation method that combines a negative feedback offset compensation method and a diode offset compensation method.

Additional embodiments of the present disclosure provide a memory device that can accurately perform data sensing by increasing a sensing weight of an N-type sense amplifier in a bit line sense amplifier in response to a hybrid offset compensation method.

According to another embodiment of the present disclosure, a bit line sense amplifier of a memory device includes an N-type sense amplifier, which is connected to a bit line and a complementary bit line, and a P-type sense amplifier, which is connected to the N-type sense amplifier through a sensing bit line and a complementary sensing bit line. A method of performing offset compensation of the bit line sense amplifier includes: (i) a normal precharge operation of charging the bit line, the complementary bit line, the sensing bit line, and the complementary sensing bit line to a precharge voltage, (ii) a first offset compensation operation of connecting the bit line to the sensing bit line, connecting the complementary bit line to the complementary sensing bit line, (iii) applying a first internal voltage greater than the precharge voltage to the P-type sense amplifier, and (iv) applying a second internal voltage less than the precharge voltage to the N-type sense amplifier. A second offset compensation operation is performed by applying the precharge voltage to the P-type sense amplifier and continuously applying the second internal voltage to the N-type sense amplifier. A bit line offset detection operation is performed by separating the bit line from the sensing bit line, separating the complementary bit line from the complementary sensing bit line, connecting the sensing bit line to the complementary sensing bit line, and applying the precharge voltage to the N-type sense amplifier.

According to another embodiment, during the first offset compensation operation, the N-type sense amplifier may support a first offset compensation ratio of an offset voltage difference between the bit line and the complementary bit line, and the P-type sense amplifier may support a second offset compensation ratio of the offset voltage difference that is less than the first offset compensation ratio.

According to a further embodiment, during the second offset compensation operation, the N-type sense amplifier may support a third offset compensation ratio of the offset voltage difference that is greater than the first offset compensation ratio, and the P-type sense amplifier may occupy a fourth offset compensation ratio of the offset voltage difference that is less than the second offset compensation ratio. In some embodiments, the fourth offset compensation ratio may be set to 10% or less.

According to another embodiment, the P-type sense amplifier may include: a first P-type transistor that is electrically coupled between a control line and the sensing bit line and has a gate connected to the complementary sensing bit line, and a second P-type transistor that is electrically coupled between the control line and the complementary sensing bit line and has a gate connected to the sensing bit line. The N-type sense amplifier may include: a first N-type transistor that is electrically coupled between a complementary control line and the sensing bit line and has a gate connected to the bit line; and a second N-type transistor that is electrically coupled between the complementary control line and the complementary sensing bit line and has a gate connected to the complementary bit line. According to still a further embodiment, the first internal voltage may be applied through the control line, and the second internal voltage may be applied through the complementary control line.

According to an additional embodiment of the present disclosure, a bit line sense amplifier included in a memory device includes: an N-type sense amplifier connected to a bit line and a complementary bit line, and a P-type sense amplifier connected to the N-type sense amplifier through a sensing bit line and a complementary sensing bit line. A method of sensing a bit line sense amplifier includes a normal precharge operation of charging the bit line, the complementary bit line, the sensing bit line, and the complementary sensing bit line to a precharge voltage. In addition, a high level precharge operation of connecting the sensing bit line to the complementary sensing bit line and applying a first internal voltage greater than the precharge voltage to the P-type sense amplifier is performed. A first sensing operation of separating the sensing bit line from the complementary sensing bit line, applying the first internal voltage to the P-type sense amplifier, and applying a second internal voltage less than the precharge voltage to the N-type sense amplifier is performed. A second sensing operation of connecting the bit line to the complementary sensing bit line, connecting the complementary bit line to the sensing bit line, applying the first internal voltage to the P-type sense amplifier, and applying the second internal voltage to the N-type sense amplifier is performed. A data output operation of outputting a voltage value of the bit line to an input/output device of the memory device, is then performed.

According to another embodiment, during the high level precharge operation, voltages of the sensing bit line and the complementary sensing bit line may be increased to a specified voltage based on the first internal voltage. And, during the first sensing operation, voltages of the sensing bit line and the complementary sensing bit line may yield a first sensing ratio by the N-type sense amplifier and a second sensing ratio by the P-type sense amplifier, and the second sensing ratio may be set to 10% or less.

According to another embodiment, the P-type sense amplifier may include a first P-type transistor that is electrically coupled between a control line and the sensing bit line and has a gate connected to the complementary sensing bit line, and a second P-type transistor that is electrically coupled between the control line and the complementary sensing bit line and has a gate connected to the sensing bit line. In addition, the N-type sense amplifier may include a first N-type transistor that is electrically coupled between a complementary control line and the sensing bit line and has a gate connected to the bit line, and a second N-type transistor that is electrically coupled between the complementary control line and the complementary sensing bit line and has a gate connected to the complementary bit line. According to an embodiment, the first internal voltage may be applied through the control line, and the second internal voltage may be applied through the complementary control line.

According to a further embodiment of the present disclosure, a memory device includes a memory cell array including a memory cell connected to a word line and a bit line, and a bit line sense amplifier that performs a sensing operation to sense and amplify data stored in the memory cell. The bit line sense amplifier includes: (i) a first P-type transistor connected between a control line and a sensing bit line and having a gate connected to a complementary sensing bit line, (ii) a second P-type transistor connected between the control line and the complementary sensing bit line and having a gate connected to the sensing bit line, (iii) a first N-type transistor connected between a complementary control line and the sensing bit line and having a gate connected to the bit line, and (iv) a second N-type transistor connected between the complementary control line and the complementary sensing bit line and having a gate connected to the complementary bit line.

During an offset compensation operation, the bit line sense amplifier applies a first internal voltage greater than a precharge voltage to the control line in a first offset compensation period and applies a second internal voltage less than the precharge voltage to the complementary control line, and then performs an offset compensation operation by applying the precharge voltage to the control line and applying the second internal voltage to the complementary control line in a second offset compensation period, to thereby detect an offset voltage difference between the bit line and the complementary bit line. During a bit line sensing operation, the bit line sense amplifier applies the first internal voltage to the control line and applies the precharge voltage to the complementary control line based on the offset voltage difference in a high level precharge period, and then applies the first internal voltage to the control line and applies the second internal voltage to the complementary control line in a sensing period, to thereby sense a voltage of the bit line.

According to an embodiment, during the first offset compensation period within the offset compensation operation, the first N-type transistor and the second N-type transistor may occupy a first offset compensation ratio of the offset voltage difference, and the first P-type transistor and the second P-type transistor may occupy a second offset compensation ratio less than the first offset compensation ratio of the offset voltage difference.

According to an additional embodiment, during the second offset compensation period within the offset compensation operation, the first N-type transistor and the second N-type transistor may occupy a third offset compensation ratio greater than the first offset compensation ratio of the offset voltage difference, and the first P-type transistor and the second P-type transistor may occupy a fourth offset compensation ratio less than the second offset compensation ratio of the offset voltage difference.

According to another embodiment, during the sensing period within the bit line sensing operation, voltages of the sensing bit line and the complementary sensing bit line may be determined by a first sensing ratio by the first N-type transistor and the second N-type transistor and a second sensing ratio by the first P-type transistor and the second P-type transistor. In some embodiments, the first sensing ratio may be the same as the third offset compensation ratio, and the second sensing ratio may be the same as the fourth offset compensation ratio.

According to an embodiment, the memory device may further include: (i) a first switching transistor that connects or separates the bit line to the sensing bit line based on a first switching signal, (ii) a second switching transistor that connects or separates the complementary bit line to the complementary sensing bit line based on the first switching signal, (iii) a third switching transistor that connects or separates the bit line to the complementary sensing bit line based on a second switching signal, (iv) a fourth switching transistor that connects or separates the complementary bit line to the sensing bit line based on the second switching signal, and (v) a fifth switching transistor that connects or separates the sensing bit line to the complementary sensing bit line based on a third switching signal.

According to an embodiment, during a normal precharge operation before the first offset compensation period within the offset compensation operation, the first switching signal, the second switching signal, and the third switching signal may be in a high level, and the precharge voltage may be applied to the complementary sensing bit line. And, during the first offset compensation period and the second offset compensation period, the first switching signal may be maintained at a high level, the second switching signal and the third switching signal may be changed to a low level, and the precharge voltage may be cut off to the complementary sensing bit line.

According to a further embodiment, during a normal precharge operation before the high level precharge period during the bit line sensing operation, the first switching signal and the third switching signal may be in a high level, the second switching signal may be in a low level, and the precharge voltage may be applied to the complementary sensing bit line. And, during the high level precharge period, the first switching signal may be changed to a low level, the word line may go to a high level, and the precharge voltage is cut off to the complementary sensing bit line. The sensing period may include a first sensing period in which the third switching signal is changed to a low level and the second internal voltage is applied to the complementary control line, and a second sensing period in which the second switching signal is changed to a high level. In addition, during the high level precharge period within the bit line sensing operation, a third internal voltage greater than the first internal voltage may be applied to the control line or the complementary sensing bit line.

BRIEF DESCRIPTION OF THE FIGURES

A detailed description of each drawing is provided to facilitate a more thorough understanding of the drawings referenced in the detailed description of the present disclosure.

DETAILED DESCRIPTION

Hereinafter, embodiments of the present disclosure may be described in detail and clearly to such an extent that an ordinary one in the art easily implements the present disclosure. In addition, a DRAM may be used as an example of a semiconductor device for describing features and functions of the present disclosure. However, a person skilled in the art may easily appreciate other advantages and performance of the present disclosure depending on the content disclosed here. The present disclosure may be implemented or applied through other embodiments. In addition, the detailed description may be changed or modified depending on view points and applications without departing from the claims, the scope and spirit, and any other purposes of the present disclosure.

Figure 1:
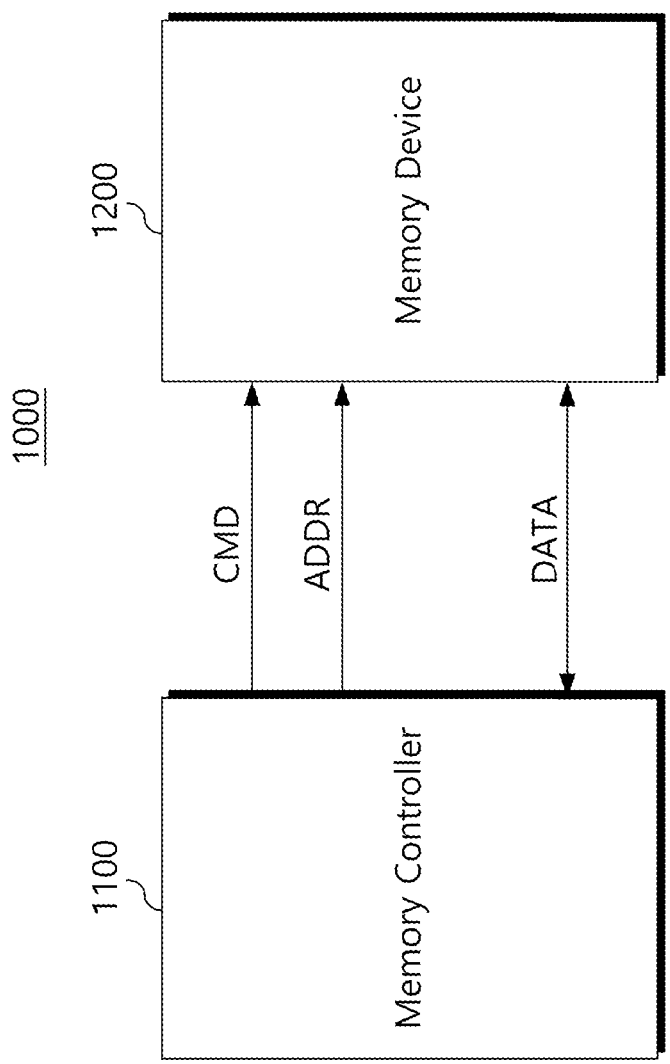
FIG. 1 is a block diagram illustrating a memory system according to an embodiment of the inventive concept.

FIG. 1 is a block diagram illustrating a memory system, according to an embodiment. Referring to FIG. 1, a memory system 1000 of the present disclosure may include a memory controller 1100 and a memory device 1200. According to an embodiment, the memory controller 1100 may perform an access operation for writing data to the memory device 1200 or reading data previously stored in the memory device 1200. For example, the memory controller 1100 may generate a command CMD and an address ADDR for writing data to the memory device 1200 or reading data stored in the memory device 1200. The memory controller 1100 may be at least one of a memory controller for controlling the memory device 1200, a system on chip (SoC) such as an application processor (AP), a central processing unit (CPU), a digital signal processor (DSP), and a graphics processing unit (GPU).

According to an embodiment, the memory controller 1100 may control the overall operation of the memory device 1200 by providing various signals to the memory device 1200. For example, the memory controller 1100 may control a memory access operation of the memory device 1200 such as a read operation and a write operation. The memory controller 1100 provides the command CMD and the address ADDR to the memory device 1200 to write data DATA to the memory device 1200 or to read data DATA from the memory device 1200.

According to an embodiment, the memory controller 1100 may generate various types of commands CMD to control the memory device 1200. For example, the memory controller 1100 may generate a bank request corresponding to a bank operation of changing states of a memory bank included in memory banks to read or write data DATA. As an example, the bank request may include an active request for changing a state of the memory bank included in the memory banks to an active state. The memory device 1200 may activate a row included in the memory bank via a word line, in response to the active request. The bank request may include a precharge request for changing the memory banks from an active state to a standby state after reading or writing of data DATA is completed. In addition, the memory controller 1100 may generate an I/O request (e.g., a CAS request) that performs a read operation or a write operation of data DATA in the memory device 1200. For example, the input/output request may include a read request for reading data DATA from activated memory banks. The input/output request may include a write request for writing data DATA to the activated memory banks. Also, the memory controller 1100 may generate a refresh command for controlling a refresh operation with respect to the memory banks. However, the types of commands CMD described herein are an example, and other types of commands CMD may also exist.

According to an embodiment, the memory device 1200 may output data DATA requested to be read by the memory controller 1100 to the memory controller 1100 or may store data DATA requested to be written by the memory controller 1100 in a memory cell. The memory device 1200 may input/output data DATA based on the command CMD and the address ADDR. The memory device 1200 may include memory banks.

In this case, the memory device 1200 may be a volatile memory device such as a dynamic random access memory (DRAM), a synchronous dynamic random access memory (SDRAM), a double data rate (DDR) DRAM, a DDR SDRAM, a low power double data rate (LPDDR) SDRAM, a graphics double data rate (GDDR) SDRAM, a rambus dynamic random access memory (RDRAM), and a static random access memory (SRAM). Alternatively, the memory device 1200 may also be implemented in a non-volatile memory device such as a resistive RAM (RRAM), a phase change memory (PRAM), a magnetoresistive memory (MRAM), a ferroelectric memory (FRAM), a spin injection magnetization inversion memory (STT-RAM), etc. In the present specification, the advantages of the present disclosure are described based on DRAM, but the technical spirit of the present disclosure is not limited thereto.

According to an embodiment, memory banks may include a memory cell array divided in units of banks, a row decoder, a column decoder, a sense amplifier, a write driver, etc. The memory banks may store data DATA requested to be written in the memory device 1200 through the write driver, and may read data DATA requested to be read using the sense amplifier. In addition, a configuration for a refresh operation for storing and maintaining data in the cell array or selection circuits according to address may be further included.

Figure 2:
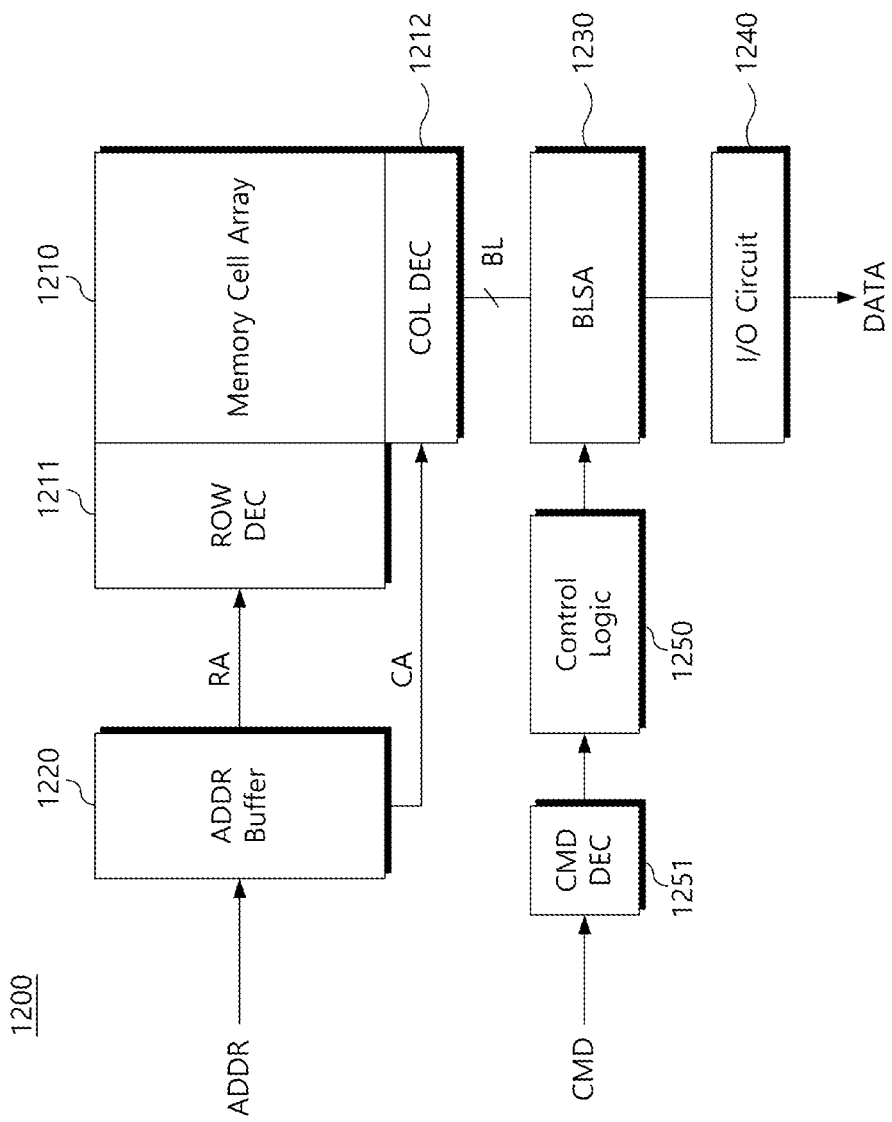
FIG. 2 is a block diagram illustrating an embodiment of the memory device of FIG. 1.

FIG. 2 is a block diagram illustrating a memory device of FIG. 1. The memory device 1200 may include a memory cell array 1210, a row decoder 1211, a column decoder 1212, an address buffer 1220, a bit line sense amplifier 1230, an input/output circuit 1240, a command decoder 1251, and control logic 1250. According to an embodiment, the memory cell array 1210 may include a plurality of memory cells provided in a matrix form arranged in rows and columns. For example, the memory cell array 1210 may include a plurality of word lines and a plurality of bit lines BL connected to memory cells. The plurality of word lines may be connected to rows of memory cells, and the plurality of bit lines BL may be connected to columns of memory cells.

According to an embodiment, the address buffer 1220 may receive an address ADDR from the memory controller 1100 of FIG. 1. This address ADDR may include a row address RA addressing a row of the memory cell array 1210 and a column address CA addressing a column of the memory cell array 1210. The address buffer 1220 may transmit the row address RA to the row decoder 1211 and may transmit the column address CA to the column decoder 1212. The row decoder 1211 may select any one of the plurality of word lines connected to the memory cell array 1210. The row decoder 1211 may decode the row address RA received from the address buffer 1220, may select one word line corresponding to the row address RA, and may activate the selected word line. In addition, the column decoder 1212 may select a specified bit line from among the plurality of bit lines BL of the memory cell array 1210. The column decoder 1212 may decode the column address CA received from the address buffer 1220 to select the specified bit line BL corresponding to the column address CA.

As shown, the bit line sense amplifier 1230 may be connected to the bit lines BL of the memory cell array 1210. For example, the bit line sense amplifier 1230 may sense a voltage change of a selected bit line among the plurality of bit lines BL, and may amplify and output the voltage change. The input/output circuit 1240 may output data DATA output based on the sensed amplified voltage from the bit line sense amplifier 1230 to the memory controller 1100 through data lines. The command decoder 1251 may decode a write enable signal (/WE), a row address strobe signal (/RAS), a column address strobe signal (/CAS), and a chip select signal (/CS) received from the memory controller 1100 such that control signals corresponding to the command CMD are generated in the control logic 1250. The command CMD may include an active request, a read request, a write request, or a precharge request. The control logic 1250 may control the overall operation of the bit line sense amplifier 1230 through the control signals corresponding to the command CMD.

Figure 3:
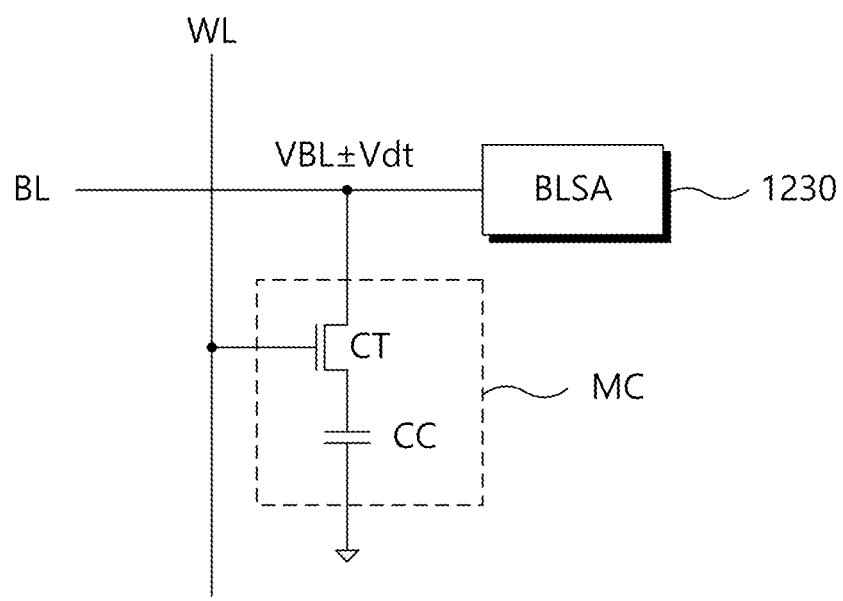
FIG. 3 is a diagram illustrating a bit line sense amplifier of FIG. 2, which is connected to one memory cell, according to an embodiment of the inventive concept.

FIG. 3 is a diagram illustrating a bit line sense amplifier of FIG. 2 connected to one memory cell. Referring to FIGS. 2 and 3, one memory cell MC included in the memory cell array 1210 may include a cell transistor CT and a cell capacitor CC. One end of the cell transistor CT may be connected to the bit line BL. The other end of the cell transistor CT may be connected to the cell capacitor CC. A gate of the cell transistor CT may be connected to a word line WL.

Referring to FIGS. 2-3, the memory device 1200 may perform a read operation or a refresh operation based on the amount of charge of the cell capacitor CC included in the memory cell MC. In this case, the bit line BL connected to the memory cell MC may be precharged to a precharge voltage VBL. Thereafter, as the word line WL is activated, a charge sharing operation occurs between the charge of the bit line BL charged to the precharge voltage VBL and the charge of the cell capacitor CC of the memory cell MC. The voltage of the bit line BL may decrease or increase by an amount of voltage change Vdt from the precharge voltage VBL by the charge sharing operation.

According to an embodiment, the bit line sense amplifier 1230 may sense the voltage change amount Vdt and may amplify it. However, when the voltage change amount Vdt is less than or equal to a specified level, the bit line sense amplifier 1230 may not sense the voltage change amount Vdt of the bit line BL. That is, an offset noise of the bit line sense amplifier 1230 may be a factor in reducing an effective sensing margin of the bit line sense amplifier 1230. Accordingly, the memory device 1200 may perform an offset compensation operation to reduce the offset noise of the bit line sense amplifier 1230.

Figure 4:
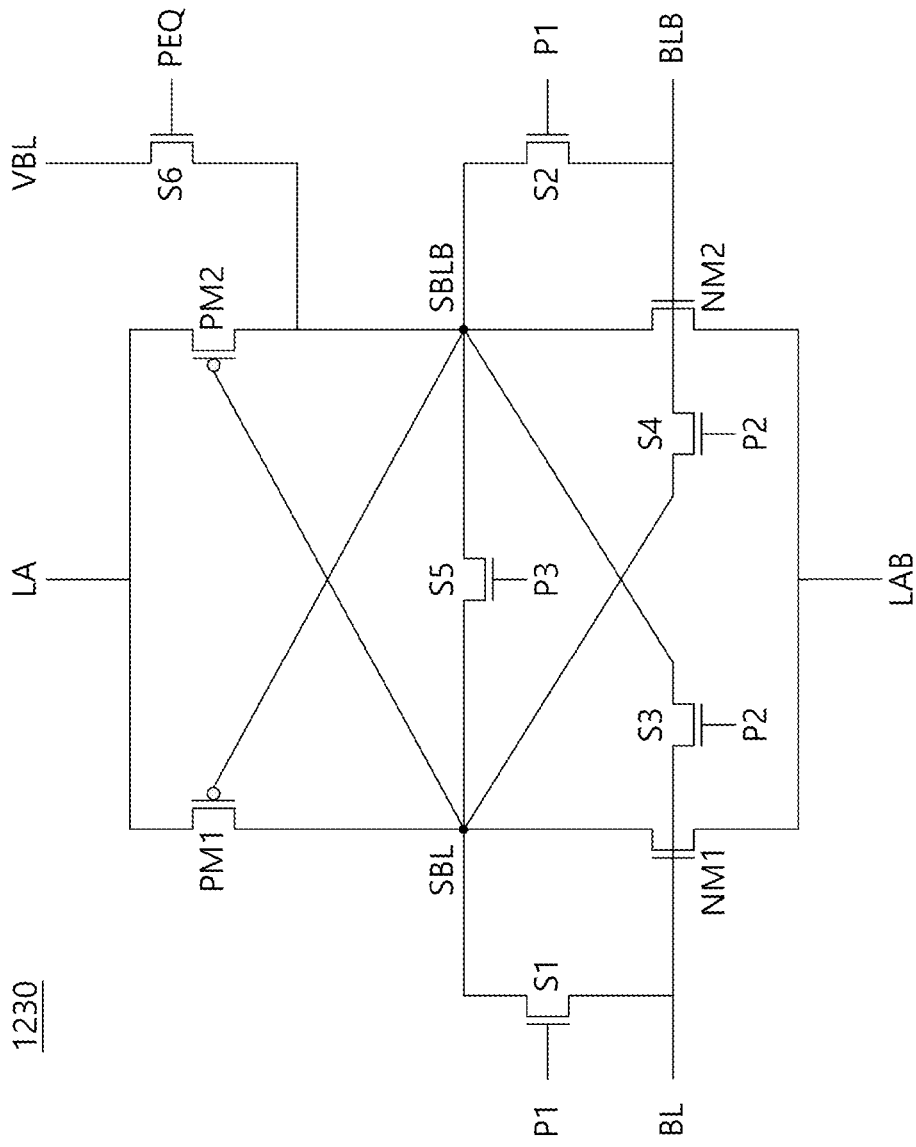
FIG. 4 is a diagram illustrating a bit line sense amplifier connected to one bit line among bit line sense amplifiers of FIG. 2, according to an embodiment of the inventive concept.

FIG. 4 is a diagram illustrating an embodiment of a bit line sense amplifier 1230 connected to one bit line among bit line sense amplifiers of FIG. 2. Referring to FIGS. 2 to 4, the bit line sense amplifier 1230 may include an N-type sense amplifier and a P-type sense amplifier. For example, the N-type sense amplifier may include N-type transistors (e.g., a first N-type transistor NM1 and a second N-type transistor NM2). The P-type sense amplifier may include P-type transistors (e.g., a first P-type transistor PM1 and a second P-type transistor PM2). The N-type sense amplifier and the P-type sense amplifier may amplify the voltage change amount Vdt of the bit line BL according to a specified ratio during the bit line sensing operation.

According to an embodiment, the bit line sense amplifier 1230 may include a plurality of switching transistors. For example, a first switching transistor S1 may be connected between the bit line BL and a sensing bit line SBL. The first switching transistor S1 may connect or separate the bit line BL to/from the sensing bit line SBL based on a first switching signal P1. A second switching transistor S2 may be connected between a complementary bit line BLB and a complementary sensing bit line SBLB. The second switching transistor S2 may connect or separate the complementary bit line BLB to/from the complementary sensing bit line SBLB based on the first switching signal P1. A third switching transistor S3 may be connected between the bit line BL and the complementary sensing bit line SBLB. The third switching transistor S3 may connect or separate between the bit line BL and the complementary sensing bit line SBLB based on a second switching signal P2. A fourth switching transistor S4 may be connected between the complementary bit line BLB and the sensing bit line SBL. The fourth switching transistor S4 may connect or separate between the complementary bit line BLB and the sensing bit line SBL based on the second switching signal P2. A fifth switching transistor S5 may be connected between the sensing bit line SBL and the complementary sensing bit line SBLB. The fifth switching transistor S5 may connect or separate between the sensing bit line SBL and the complementary sensing bit line SBLB based on a third switching signal P3. A sixth switching transistor S6 may be connected between a line of the precharge voltage VBL and the complementary sensing bit line SBLB. The sixth switching transistor S6 may connect or separate between the line of the precharge voltage VBL and the complementary sensing bit line SBLB based on an equalization signal PEQ.

According to an embodiment, the N-type sense amplifier and the P-type sense amplifier are connected between the sensing bit line SBL and the complementary sensing bit line SBLB, and may sense and amplify a voltage difference between the bit line BL and the complementary bit line BLB based on voltages of a control line LA and a complementary control line LAB. For example, one end of the first P-type transistor PM1 may be connected to the control line LA, the other end of the first P-type transistor PM1 may be connected to the sensing bit line SBL, and a gate of the first P-type transistor PM1 may be connected to the complementary sensing bit line SBLB. One end of the second P-type transistor PM2 may be connected to the control line LA, the other end of the second P-type transistor PM2 may be connected to the complementary sensing bit line SBLB, and a gate of the second P-type transistor PM2 may be connected to the sensing bit line SBL. One end of the first N-type transistor NM1 may be connected to the sensing bit line SBL, the other end of the first N-type transistor NM1 may be connected to the complementary control line LAB, and a gate of the first N-type transistor NM1 may be connected to the bit line BL. One end of the second N-type transistor NM2 may be connected to the complementary sensing bit line SBLB, the other end of the second N-type transistor NM2 may be connected to the complementary control line LAB, and a gate of the second N-type transistor NM2 may be connected to the complementary bit line BLB.

Figure 5:
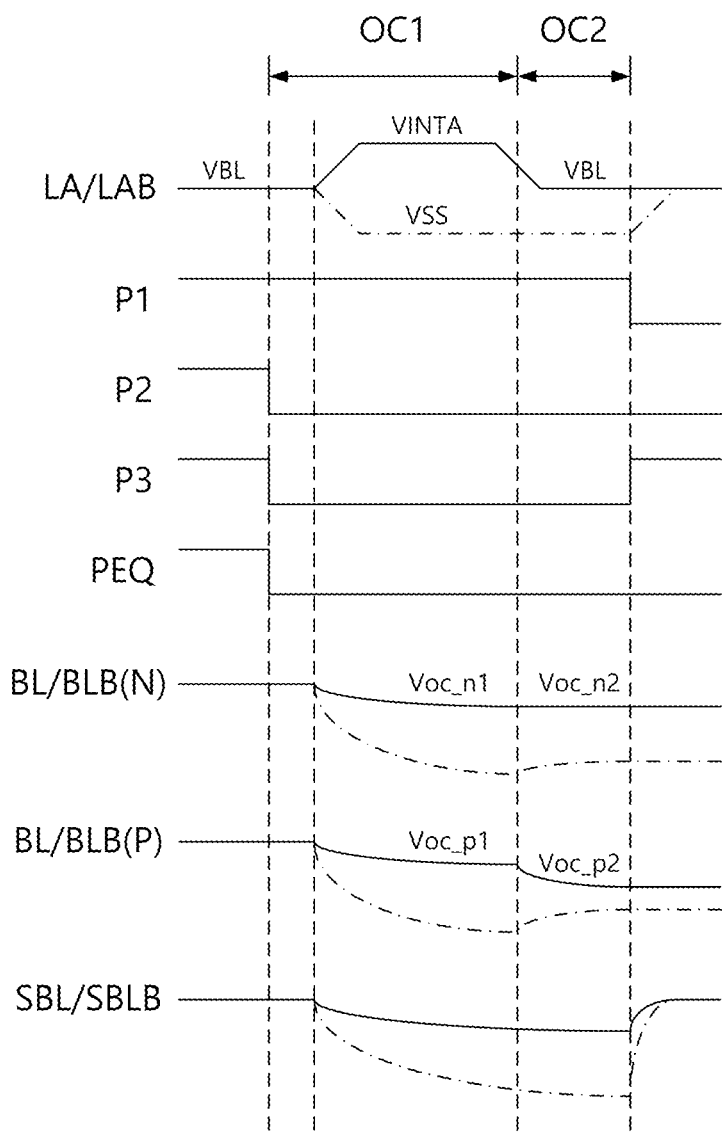
FIG. 5 is a timing diagram illustrating an offset compensation method of a bit line sense amplifier, according to an embodiment of the inventive concept.
Figure 6:
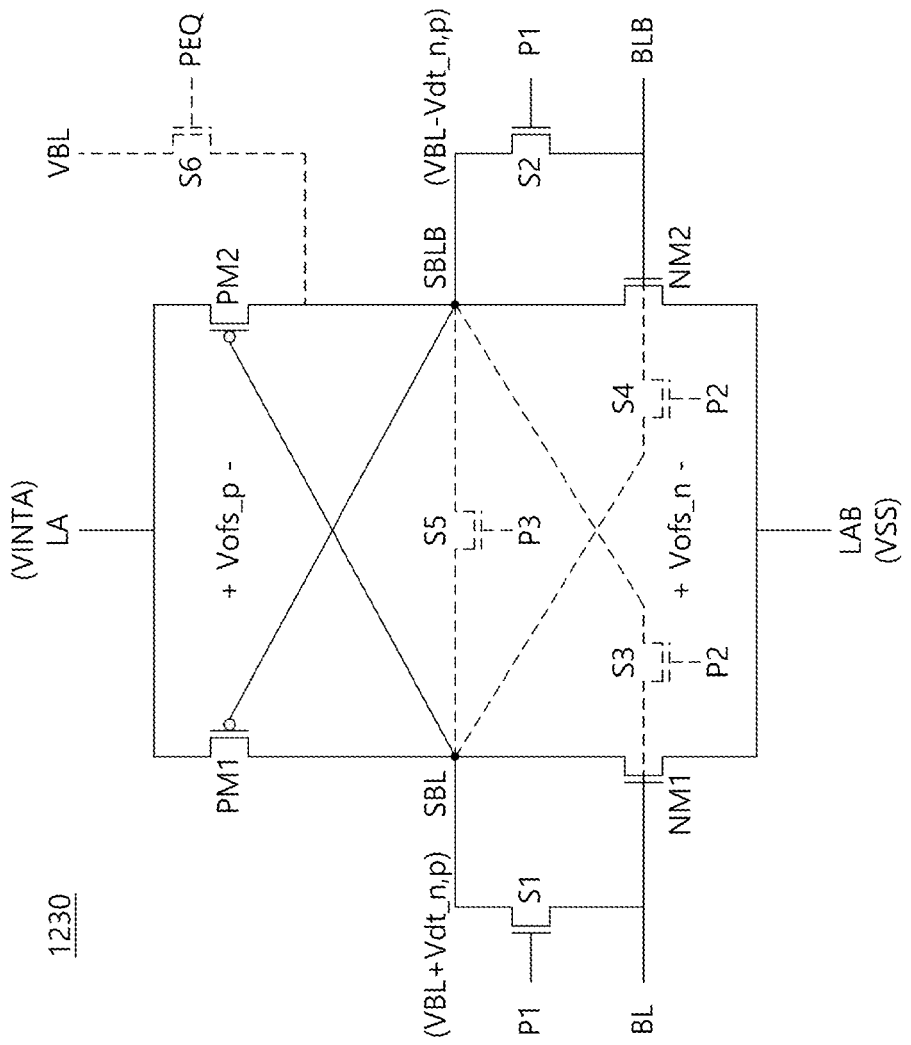
FIG. 6 is a diagram illustrating an offset compensation operation of a bit line sense amplifier of FIG. 4 in a first offset compensation period of FIG. 5, according to an embodiment of the inventive concept.
Figure 7:
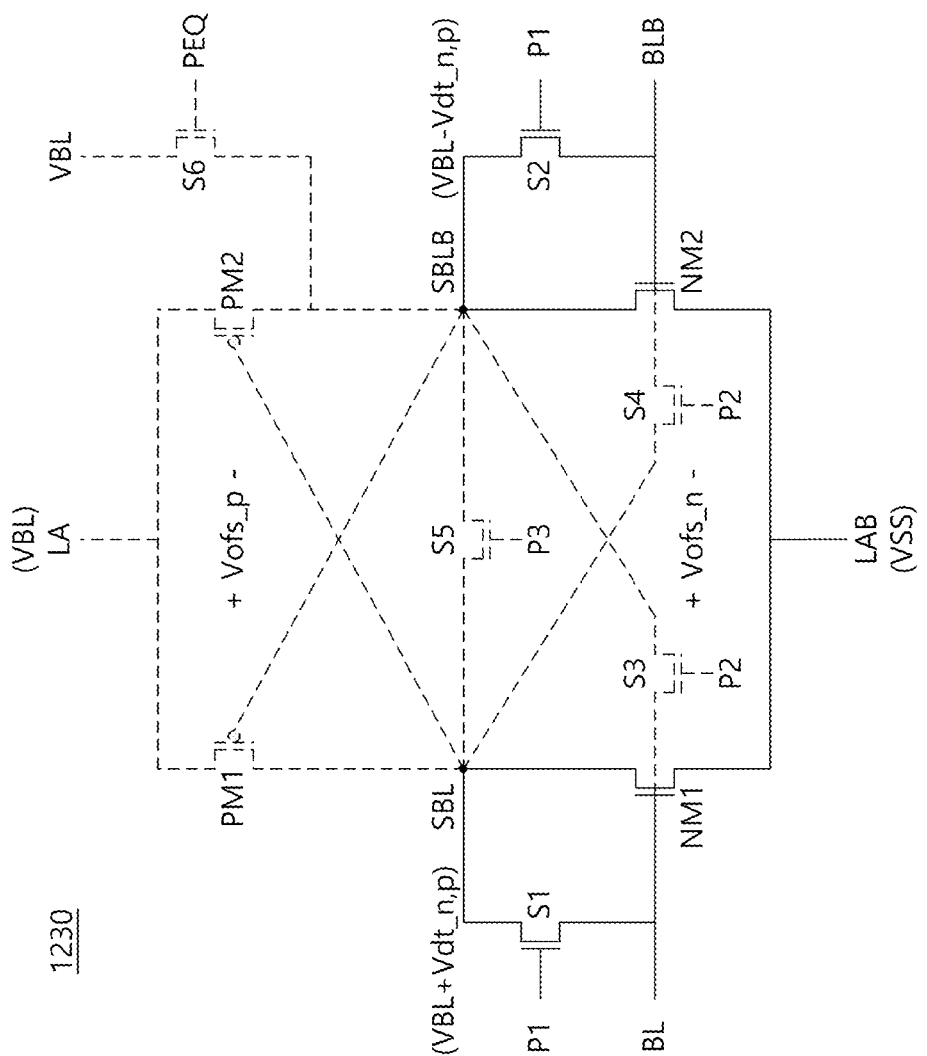
FIG. 7 is a diagram illustrating an offset compensation operation of a bit line sense amplifier of FIG. 4 in a second offset compensation period of FIG. 5, according to an embodiment of the inventive concept.
Figure 8:
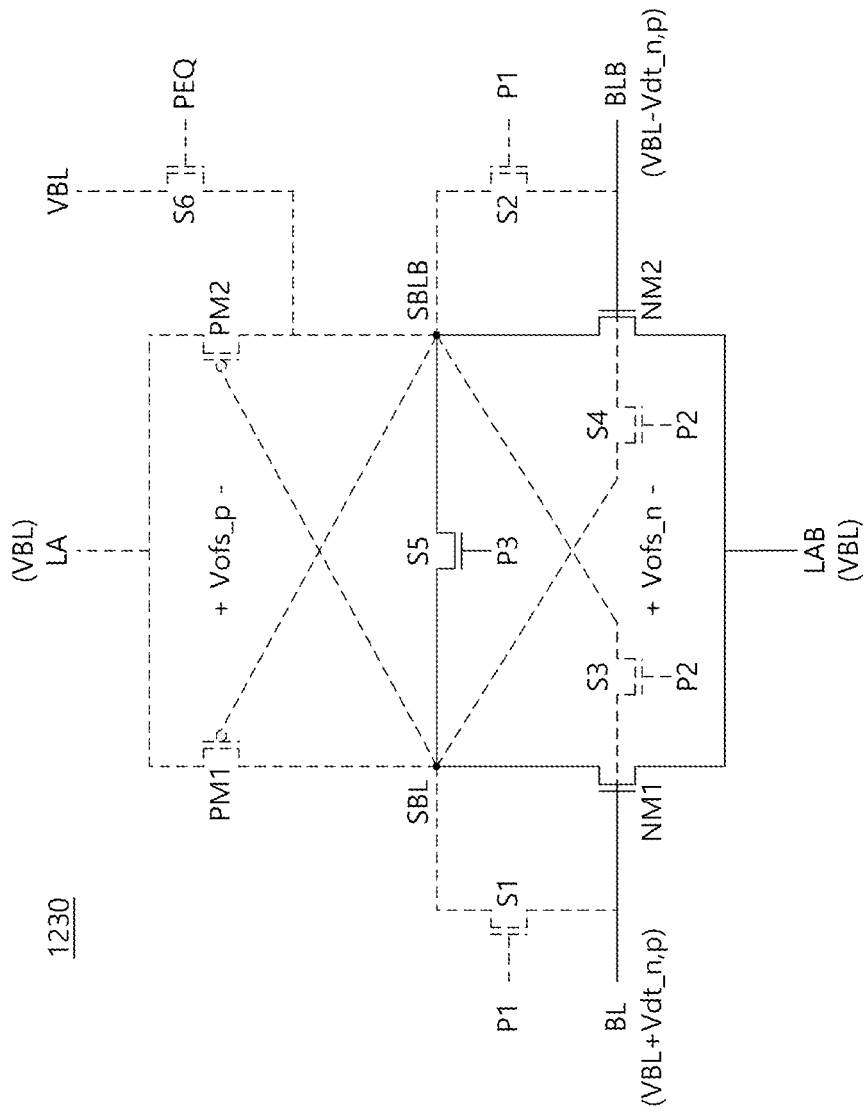
FIG. 8 is a diagram illustrating an offset compensation operation of a bit line sense amplifier of FIG. 4 after a second offset compensation period of FIG. 5, according to an embodiment of the inventive concept.

FIG. 5 is a timing diagram illustrating an offset compensation method of a bit line sense amplifier, according to an embodiment. FIG. 6 is a diagram illustrating an offset compensation operation of a bit line sense amplifier of FIG. 4 in a first offset compensation period of FIG. 5. FIG. 7 is a diagram illustrating an offset compensation operation of a bit line sense amplifier of FIG. 4 in a second offset compensation period of FIG. 5. FIG. 8 is a diagram illustrating an offset compensation operation of a bit line sense amplifier of FIG. 4 after a second offset compensation period of FIG. 5.

Referring to FIGS. 5 to 8, the bit line sense amplifier 1230 may operate like a negative feedback offset compensation method in a first offset compensation period OC1. The bit line sense amplifier 1230 may operate like a diode offset compensation method in a second offset compensation period OC2. The negative feedback offset compensation method has a high operating speed, but the efficiency of offset compensation may decrease due to the distribution of sensing characteristics due to process variation and temperature (PVT). In contrast, the diode offset compensation method may have a good PVT distribution characteristic, but may have a slow operation speed. The memory device 1200 of the present disclosure may perform the offset compensation operation of the bit line sense amplifier 1230 using a hybrid offset method combining the advantages of the negative feedback offset compensation method and the diode offset compensation method.

According to an embodiment, before the first offset compensation period OC1, the bit line sense amplifier 1230 may perform a normal precharge operation. For example, the bit line BL, the complementary bit line BLB, the sensing bit line SBL, and the complementary sensing bit line SBLB may be equalized to the precharge voltage VBL. The first switching signal P1, the second switching signal P2, the third switching signal P3, and the equalization signal PEQ may have a high level. Accordingly, the bit line BL, the complementary bit line BLB, the sensing bit line SBL, and the complementary sensing bit line SBLB are all connected and may be charged to the precharge voltage VBL. In this case, the control line LA and the complementary control line LAB may have the same voltage level. For example, the control line LA and the complementary control line LAB may have the precharge voltage VBL.

According to an embodiment, in the first offset compensation period OC1 (refer to FIG. 6), the bit line sense amplifier 1230 may perform the first offset compensation operation. For example, the first switching signal P1 may be maintained at a high level. The second switching signal P2, the third switching signal P3, and the equalization signal PEQ may be changed to a low level. Accordingly, the sensing bit line SBL and the complementary sensing bit line SBLB may be separated from each other. The bit line BL and the complementary sensing bit line SBLB may be separated from each other. The complementary bit line BLB and the sensing bit line SBL may be separated from each other. In this case, a first internal voltage VINTA greater than the precharge voltage VBL is applied to the control line LA, and a second internal voltage VSS less than the precharge voltage VBL is applied to the complementary control line LAB.

According to an embodiment, in the first offset compensation period OC1, the bit line BL and the complementary bit line BLB (or the sensing bit line SBL and the complementary sensing bit line SBLB) may have a predetermined voltage difference (hereinafter, an offset voltage difference) due to the offset of the N-type sense amplifier and the P-type sense amplifier. For example, the bit line BL and the complementary bit line BLB may have an N-type offset voltage Vofs_n due to the offset of the first N-type transistor NM1 and the second N-type transistor NM2. In addition, the bit line BL and the complementary bit line BLB may have a P-type offset voltage Vofs_p due to the offset of the first P-type transistor PM1 and the second P-type transistor PM2. That is, the bit line BL and the complementary bit line BLB may have an offset voltage difference 2Vdt_n,p obtained by summing the N-type offset voltage Vofs_n and the P-type offset voltage Vofs_p. The N-type offset voltage Vofs_n may occupy a first offset compensation ratio Voc_n1 (e.g., 70%) among the offset voltage difference 2Vdt_n,p. The P-type offset voltage Vofs_p may occupy a second offset compensation ratio Voc_p1 (e.g., 30%) that is less than the first offset compensation ratio Voc_n1 among the offset voltage difference 2Vdt_n,p.

According to an embodiment, in the second offset compensation period OC2 (refer to FIG. 7), the bit line sense amplifier 1230 may perform a second offset compensation operation. For example, the first switching signal P1 may be maintained at a high level. The second switching signal P2, the third switching signal P3, and the equalization signal PEQ may be maintained at a low level. Accordingly, the sensing bit line SBL and the complementary sensing bit line SBLB may be separated from each other. The bit line BL and the complementary sensing bit line SBLB may be separated from each other. The complementary bit line BLB and the sensing bit line SBL may be separated from each other. In this case, a voltage of the control line LA may be changed from the first internal voltage VINTA to the precharge voltage VBL. A voltage of the complementary control line LAB may be maintained at the second internal voltage VSS. Accordingly, the first P-type transistor PM1 and the second P-type transistor PM2 may be turned off.

According to an embodiment, in the second offset compensation period OC2, as the first P-type transistor PM1 and the second P-type transistor PM2 are turned off, the ratio of the N-type offset voltage Vofs_n to the P-type offset voltage Vofs_p may be changed between the bit line BL and the complementary bit line BLB (or between the sensing bit line SBL and the complementary sensing bit line SBLB). For example, the N-type offset voltage Vofs_n may occupy a third offset compensation ratio Voc_n2 (e.g., 90%) greater than the first offset compensation ratio Voc_n1 among the offset voltage difference 2Vdt_n,p. The p-type offset voltage Vofs_p may occupy a fourth offset compensation ratio Voc_p2 (e.g., 10%) less than the second offset compensation ratio Voc_p1 among the offset voltage difference 2Vdt_n,p. For example, the fourth offset compensation ratio Voc_p2 may be set to 10% or less.

According to an embodiment, after the second offset compensation period OC2, the bit line sense amplifier 1230 may perform a bit line offset detection operation between the bit line BL and the complementary bit line BLB. For example, the first switching signal P1 may be changed to a low level. Accordingly, the bit line BL and the sensing bit line SBL may be separated from each other. The complementary bit line BLB and the complementary sensing bit line SBLB may be separated from each other. The third switching signal P3 may be changed to a high level. Accordingly, the sensing bit line SBL and the complementary sensing bit line SBLB may be connected to each other. The complementary control line LAB may be changed to the precharge voltage VBL. Accordingly, the bit line BL and the complementary bit line BLB may maintain the offset voltage difference 2Vdt_n,p. In addition, the sensing bit line SBL and the complementary sensing bit line SBLB may have the precharge voltage VBL through the complementary control line LAB.

As described above, in the first offset compensation period OC1, the bit line sense amplifier 1230 may quickly detect the offset voltage difference 2Vdt_n,p including the N-type offset voltage Vofs_n and the P-type offset voltage Vofs_p through the negative feedback offset compensation method. Also, the bit line sense amplifier 1230 may finally detect the offset voltage difference 2Vdt_n,p while improving the PVT distribution characteristic through the diode offset compensation method in the second offset compensation period OC2. Meanwhile, the bit line sense amplifier 1230 may change the ratio of the N-type offset voltage Vofs_n to the P-type offset voltage Vofs_p constituting the offset voltage difference 2Vdt_n,p through the first offset compensation period OC1 and the second offset compensation period OC2. By changing the ratio of the N-type offset voltage Vofs_n to the P-type offset voltage Vofs_p, the bit line sense amplifier 1230 may improve the accuracy of the bit line sensing operation of the present disclosure.

Figure 9:
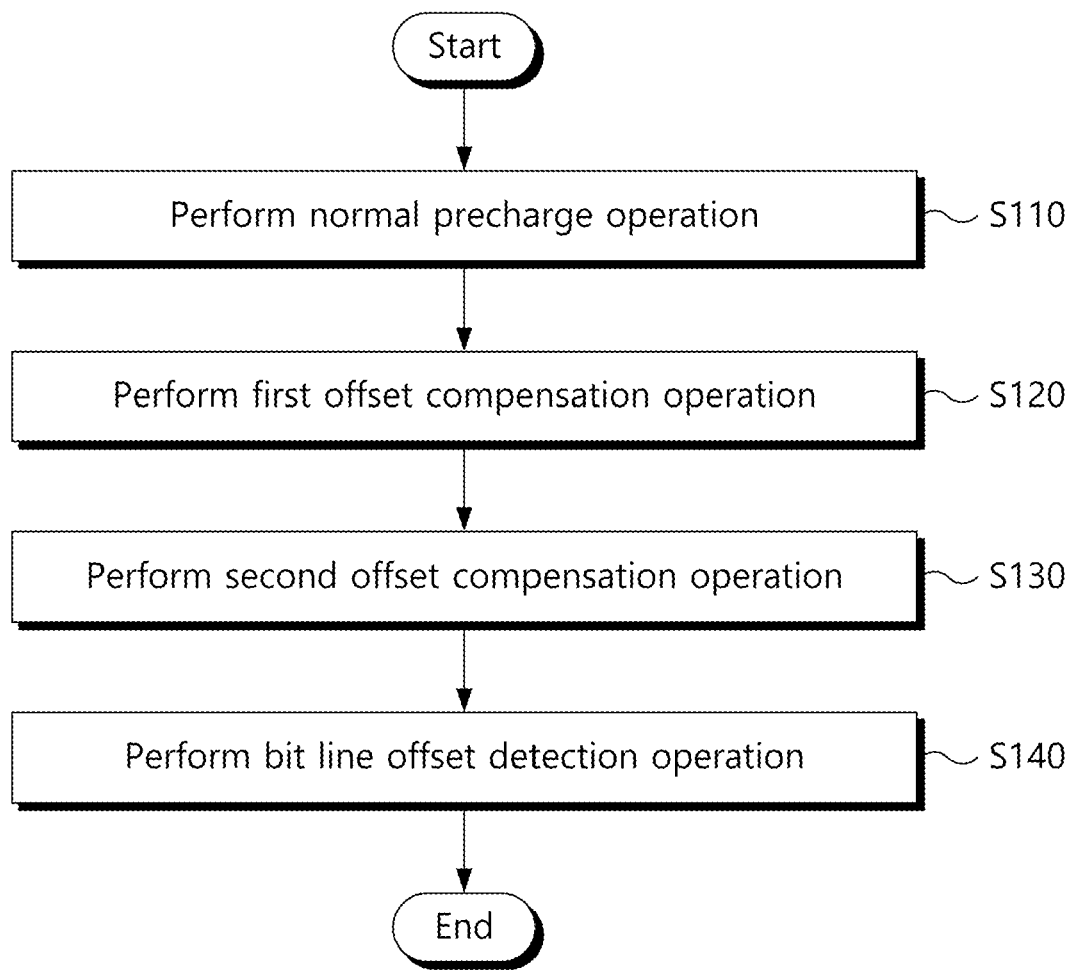
FIG. 9 is a flowchart illustrating an offset compensation method of a bit line sense amplifier, according to an embodiment of the inventive concept.

FIG. 9 is a flowchart illustrating an offset compensation method of a bit line sense amplifier, according to an embodiment. Referring to FIGS. 5 to 9, the memory device 1200 of FIG. 2 may perform the offset compensation operation of the bit line sense amplifier 1230 through the hybrid offset method combining the advantages of the negative feedback offset compensation method and the diode offset compensation method, as described hereinabove.

According to an embodiment, in operation S110, the bit line sense amplifier 1230 may perform a normal precharge operation. For example, before the first offset compensation period OC1 of FIG. 5, the bit line BL, the complementary bit line BLB, the sensing bit line SBL, and the complementary sensing bit line SBLB may be equalized to the precharge voltage VBL in the bit line sense amplifier 1230. The first switching signal P1, the second switching signal P2, the third switching signal P3, and the equalization signal PEQ may have a high level. Accordingly, the bit line BL, the complementary bit line BLB, the sensing bit line SBL, and the complementary sensing bit line SBLB are all connected and may be charged to the precharge voltage VBL. In this case, the control line LA and the complementary control line LAB may have the same voltage level. For example, the control line LA and the complementary control line LAB may have the precharge voltage VBL.

According to an embodiment, in operation S120, the bit line sense amplifier 1230 may perform a first offset compensation operation. For example, in the first offset compensation period OC1 of FIG. 5, the first switching signal P1 may be maintained at a high level. The second switching signal P2, the third switching signal P3, and the equalization signal PEQ may be changed to a low level. Accordingly, the sensing bit line SBL and the complementary sensing bit line SBLB may be separated from each other. The bit line BL and the complementary sensing bit line SBLB may be separated from each other. The complementary bit line BLB and the sensing bit line SBL may be separated from each other. In this case, the first internal voltage VINTA greater than the precharge voltage VBL is applied to the control line LA, and the second internal voltage VSS less than the precharge voltage VBL is applied to the complementary control line LAB.

According to an embodiment, in operation S130, the bit line sense amplifier 1230 may perform a second offset compensation operation. For example, in the second offset compensation period OC2 of FIG. 5, the first switching signal P1 may be maintained at a high level. The second switching signal P2, the third switching signal P3, and the equalization signal PEQ may be maintained at a low level. Accordingly, the sensing bit line SBL and the complementary sensing bit line SBLB may be separated from each other. The bit line BL and the complementary sensing bit line SBLB may be separated from each other. The complementary bit line BLB and the sensing bit line SBL may be separated from each other. In this case, a voltage of the control line LA may be changed from the first internal voltage VINTA to the precharge voltage VBL. A voltage of the complementary control line LAB may be maintained at the second internal voltage VSS. Accordingly, the first P-type transistor PM1 and the second P-type transistor PM2 may be turned off.

According to an embodiment, in operation S140, the bit line sense amplifier 1230 may perform a bit line offset detection operation. For example, after the second offset compensation period OC2 of FIG. 5, the first switching signal P1 may be changed to a low level. Accordingly, the bit line BL and the sensing bit line SBL may be separated from each other. The complementary bit line BLB and the complementary sensing bit line SBLB may be separated from each other. The third switching signal P3 may be changed to a high level. Accordingly, the sensing bit line SBL and the complementary sensing bit line SBLB may be connected to each other. The complementary control line LAB may be changed to the precharge voltage VBL. Accordingly, the bit line BL and the complementary bit line BLB may maintain the offset voltage difference 2Vdt_n,p. In addition, the sensing bit line SBL and the complementary sensing bit line SBLB may have the precharge voltage VBL through the complementary control line LAB.

According to an embodiment, in operation S120, the bit line sense amplifier 1230 may quickly detect the offset voltage difference 2Vdt_n,p including the N-type offset voltage Vofs_n and the P-type offset voltage Vofs_p through the negative feedback offset compensation method. In addition, in operation S130, the bit line sense amplifier 1230 may finally detect the offset voltage difference 2Vdt_n,p while improving the PVT distribution characteristic through the diode offset compensation method. Meanwhile, the bit line sense amplifier 1230 may change the ratio of the N-type offset voltage Vofs_n to the P-type offset voltage Vofs_p constituting the offset voltage difference 2Vdt_n,p through operations S120 and S130. By changing the ratio of the N-type offset voltage Vofs_n to the P-type offset voltage Vofs_p, the bit line sense amplifier 1230 may improve the accuracy of the bit line sensing operation of the present disclosure.

Figure 10:
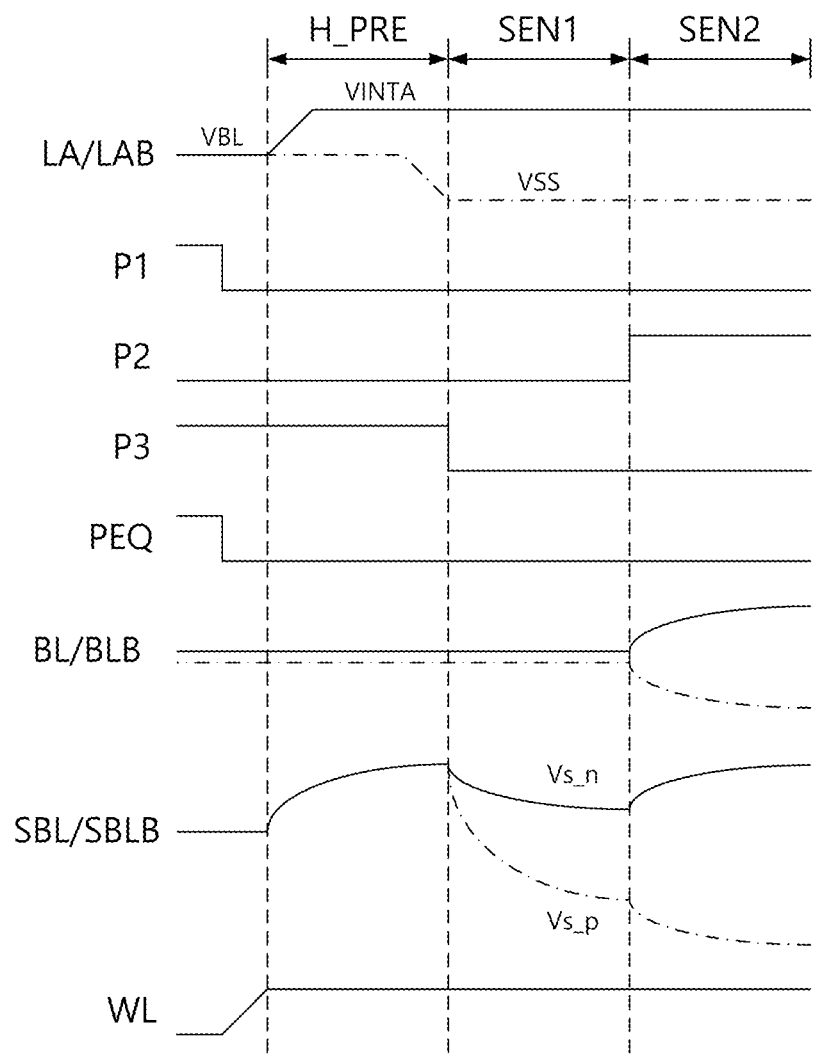
FIG. 10 is a timing diagram illustrating a bit line sensing method of a bit line sense amplifier, according to an embodiment of the inventive concept.
Figure 11:
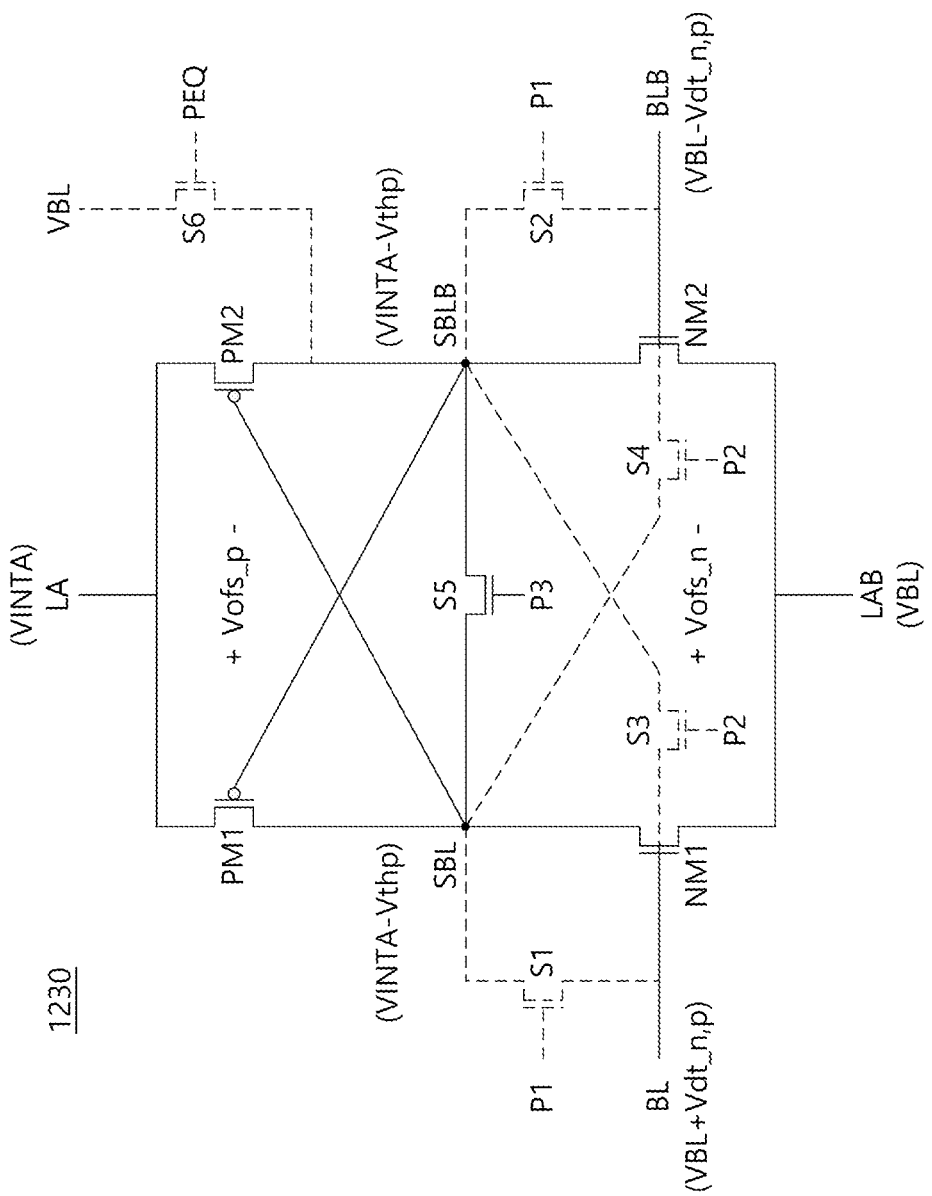
FIG. 11 is a diagram illustrating a bit line sensing operation of a bit line sense amplifier of FIG. 4 in a high level precharge period of FIG. 10.
Figure 12:
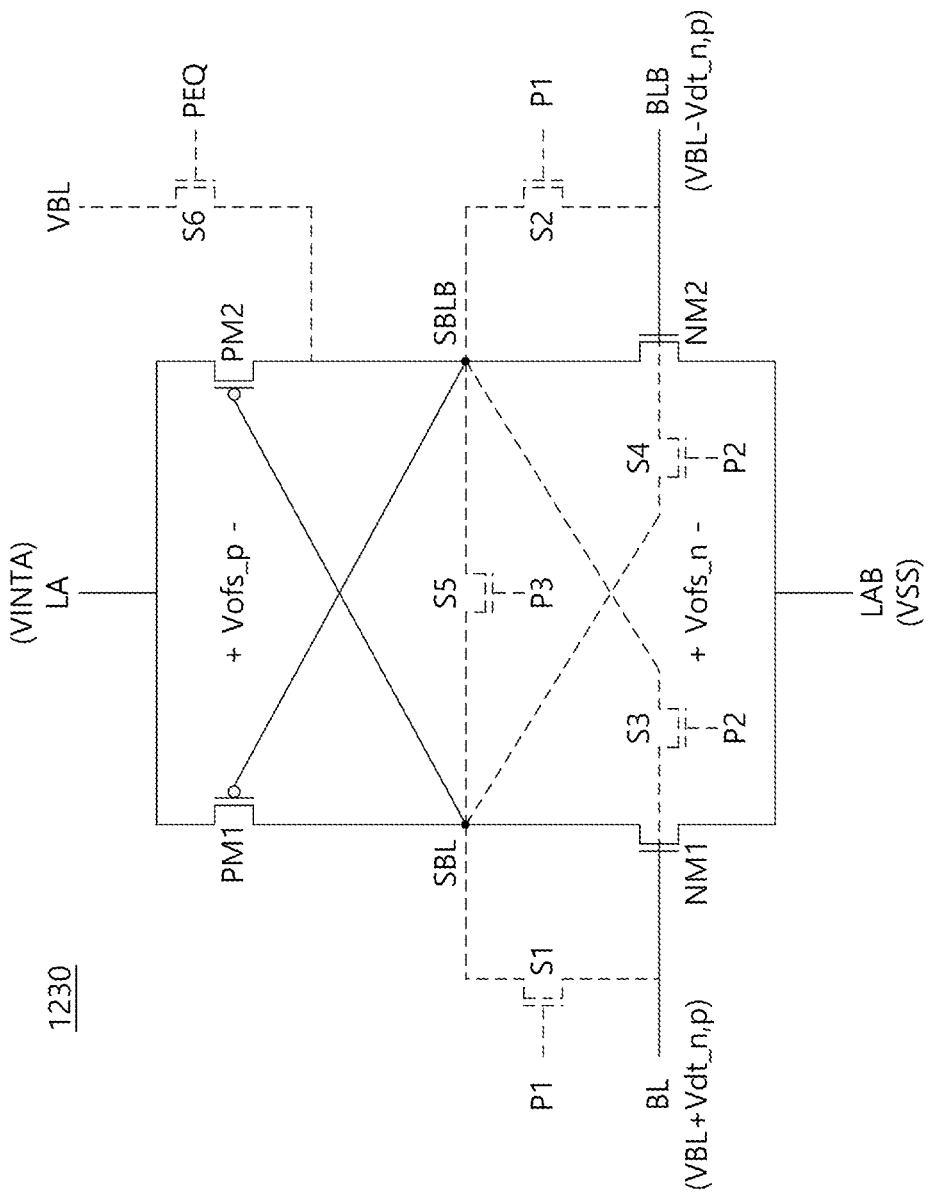
FIG. 12 is a diagram illustrating a bit line sensing operation of a bit line sense amplifier of FIG. 4 in a first sensing period of FIG. 10.
Figure 13:
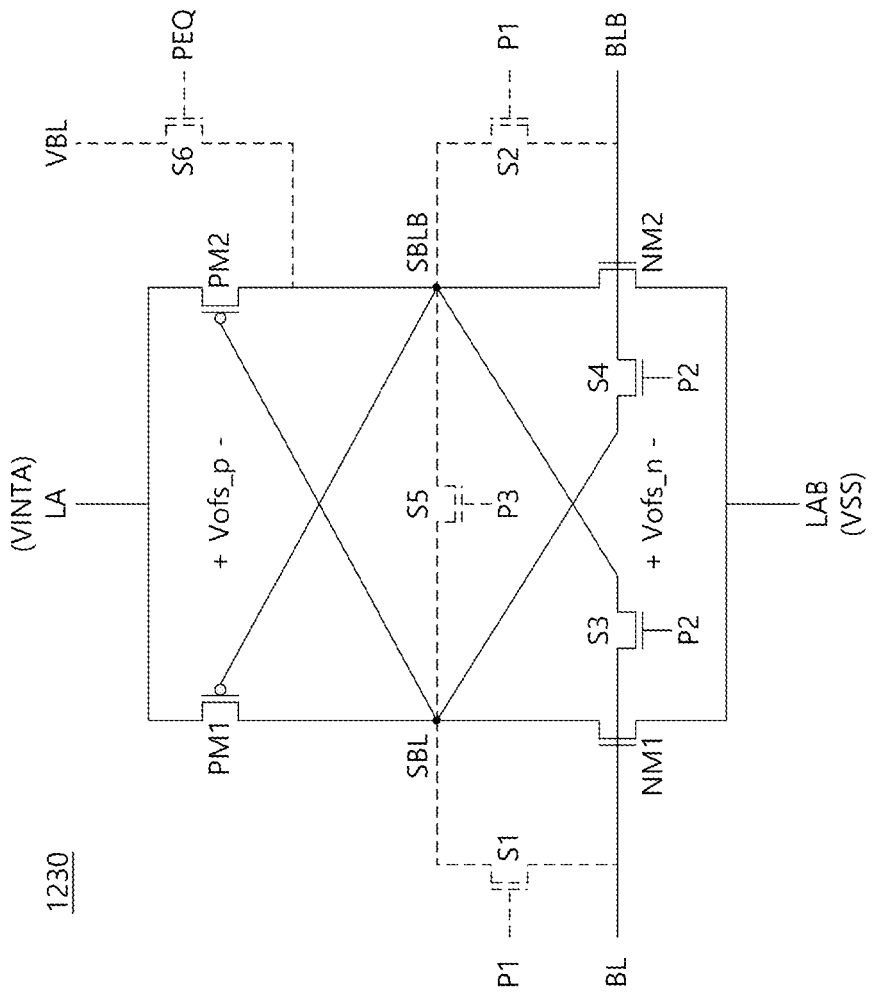
FIG. 13 is a diagram illustrating a bit line sensing operation of a bit line sense amplifier of FIG. 4 in a second sensing period of FIG. 10.

FIG. 10 is a timing diagram illustrating a bit line sensing method of a bit line sense amplifier, according to an embodiment. FIG. 11 is a diagram illustrating a bit line sensing operation of a bit line sense amplifier of FIG. 4 in a high level precharge period of FIG. 10. FIG. 12 is a diagram illustrating a bit line sensing operation of a bit line sense amplifier of FIG. 4 in a first sensing period of FIG. 10. FIG. 13 is a diagram illustrating a bit line sensing operation of a bit line sense amplifier of FIG. 4 in a second sensing period of FIG. 10. Referring to FIGS. 10 to 13, the bit line sense amplifier 1230 may improve sensing efficiency by increasing the sensing ratio of the N-type sense amplifier compared to the P-type sense amplifier.

According to an embodiment, before a high level precharge period H_PRE, the bit line sense amplifier 1230 may perform a normal precharge operation. For example, the bit line BL, the complementary bit line BLB, the sensing bit line SBL, and the complementary sensing bit line SBLB may be equalized to the precharge voltage VBL. The first switching signal P1, the third switching signal P3, and the equalization signal PEQ may have a high level. The second switching signal P2 may have a low level. Accordingly, the bit line BL and the sensing bit line SBL may be connected. The complementary bit line BLB and the complementary sensing bit line SBLB may be connected. The sensing bit line SBL and the complementary sensing bit line SBLB may be connected. The precharge voltage VBL may be applied to the complementary sensing bit line SBLB. Accordingly, the bit line BL, the complementary bit line BLB, the sensing bit line SBL, and the complementary sensing bit line SBLB may be equalized to the precharge voltage VBL. In this case, the control line LA and the complementary control line LAB may have the same voltage level. For example, the control line LA and the complementary control line LAB may have the precharge voltage VBL.

According to an embodiment, in the high level precharge period H_PRE (refer to FIG. 11), the bit line sense amplifier 1230 may precharge the sensing bit line SBL and the complementary sensing bit line SBLB to a voltage greater than the precharge voltage VBL. For example, the first switching signal P1 and the equalization signal PEQ may be changed to a low level. Accordingly, the bit line BL and the sensing bit line SBL may be separated. The complementary bit line BLB and the complementary sensing bit line SBLB may be separated. The supply of the precharge voltage VBL may be separated from the complementary sensing bit line SBLB. The first internal voltage VINTA greater than the precharge voltage VBL may be applied to the control line LA. Accordingly, the sensing bit line SBL and the complementary sensing bit line SBLB may rise to a predetermined voltage (e.g., VINTA-Vthp, where Vthp is a threshold voltage of the first P-type transistor PM1 or the second P-type transistor PM2). In this case, a high level may be applied to the word line WL. The word line WL may maintain a high level during the bit line sensing operation.

According to an embodiment, in a first sensing period SEN1 (e.g., N-dominant sensing) (refer to FIG. 12), the bit line sense amplifier 1230 may perform a pre-sensing operation. For example, the third switching signal P3 may be changed to a low level. Accordingly, the sensing bit line SBL and the complementary sensing bit line SBLB may be separated from each other. The second internal voltage VSS less than the precharge voltage VBL may be applied to the complementary control line LAB. In this case, the voltage of the sensing bit line SBL and the voltage of the complementary sensing bit line SBLB may have different voltage values based on the N-type sense amplifier (e.g., the first N-type transistor NM1 or the second N-type transistor NM2). In this case, the sensing ratio of the N-type sense amplifier may occupy a first sensing ratio Vs_n (e.g., 90%). The sensing ratio of the P-type sense amplifier may occupy a second sensing ratio Vs_p (e.g., 10%). For example, the first sensing ratio Vs_n may be the same as the third offset compensation ratio Voc_n2 during the offset compensation operation in FIG. 5. The second sensing ratio Vs_p may be the same as the fourth offset compensation ratio Voc_p2 during the offset compensation operation in FIG. 5.

According to an embodiment, in a second sensing period SEN2 (refer to FIG. 13), the bit line sense amplifier 1230 may perform a restore operation. For example, the second switching signal P2 may be changed to a high level. Accordingly, the bit line BL and the complementary sensing bit line SBLB may be connected. The complementary bit line BLB and the sensing bit line SBL may be connected. Accordingly, the bit line BL may increase (or decrease) to the voltage level of the complementary sensing bit line SBLB. The complementary bit line BLB may increase (or decrease) to the voltage level of the sensing bit line SBL. The bit line sense amplifier 1230 may be connected to the data line after the first sensing period SEN1 and may output the data to the input/output circuit 1240 of FIG. 2 through the data line.

As described above, the bit line sense amplifier 1230 may precharge the sensing bit line SBL and the complementary sensing bit line SBLB with a voltage greater than the precharge voltage VBL in the high level precharge period H_PRE. Accordingly, a pre-sensing operation in which the sensing ratio of the N-type sense amplifier occupies 90% or more in the first sensing period SEN1 may be performed. Alternatively, a pre-sensing operation in which the sensing ratio of the P-type sense amplifier occupies 10% or less in the first sensing period SEN1 may be performed. In this manner, the sensing efficiency of the bit line sense amplifier 1230 may be improved. In addition, the sensing ratio of the N-type sense amplifier to the P-type sense amplifier in the bit line sensing operation of FIG. 10 may be matched with the offset compensation ratio of the N-type sense amplifier to the P-type sense amplifier in the offset compensation operation of FIG. 5, so that the sensing efficiency of the bit line sense amplifier 1230 may be improved.

Figure 14:
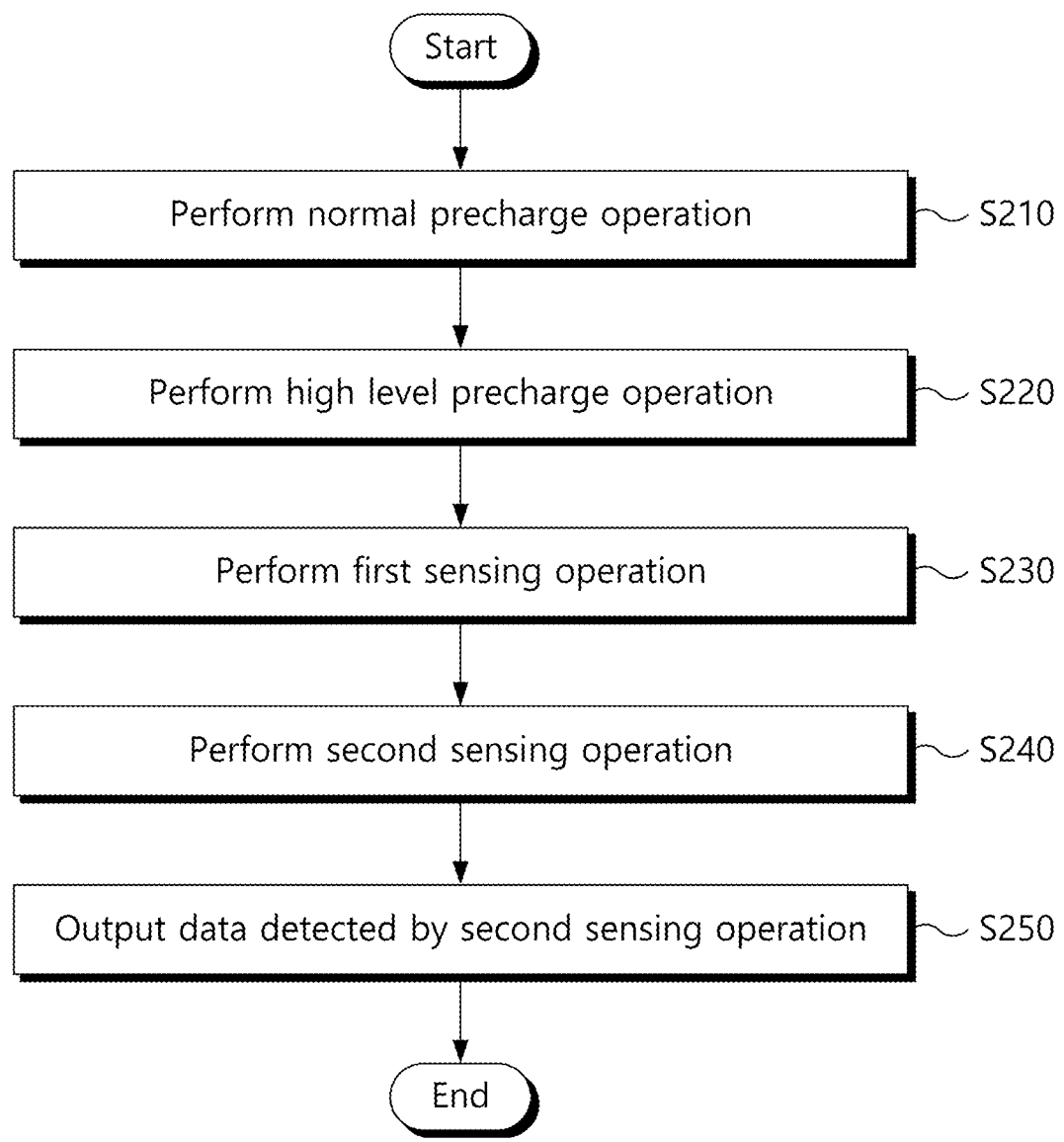
FIG. 14 is a flowchart illustrating a sensing method of a bit line sense amplifier, according to an embodiment of the inventive concept.

FIG. 14 is a flowchart illustrating a sensing method of a bit line sense amplifier, according to another embodiment. Referring to FIGS. 10 to 14, the memory device 1200 of FIG. 2 may raise the voltages of the sensing bit line SBL and the complementary sensing bit line SBLB to a specified voltage through the high level precharge operation, and then may perform the bit line sensing operation of the bit line sense amplifier 1230.

According to an embodiment, in operation S210, the bit line sense amplifier 1230 may perform a normal precharge operation. For example, before the high level precharge period H_PRE of FIG. 10, the first switching signal P1, the third switching signal P3, and the equalization signal PEQ may have a high level. The second switching signal P2 may have a low level. Accordingly, the bit line BL and the sensing bit line SBL may be connected. The complementary bit line BLB and the complementary sensing bit line SBLB may be connected. The sensing bit line SBL and the complementary sensing bit line SBLB may be connected. The precharge voltage VBL may be applied to the complementary sensing bit line SBLB. Accordingly, the bit line BL, the complementary bit line BLB, the sensing bit line SBL, and the complementary sensing bit line SBLB may be equalized to the precharge voltage VBL. In this case, the control line LA and the complementary control line LAB may have the same voltage level. For example, the control line LA and the complementary control line LAB may have the precharge voltage VBL.

According to an embodiment, in operation S220, the bit line sense amplifier 1230 may perform a high level precharge operation. For example, in the high level precharge period H_PRE of FIG. 10, the first switching signal P1 and the equalization signal PEQ may be changed to a low level. Accordingly, the bit line BL and the sensing bit line SBL may be separated. The complementary bit line BLB and the complementary sensing bit line SBLB may be separated. The supply of the precharge voltage VBL may be separated from the complementary sensing bit line SBLB. The first internal voltage VINTA greater than the precharge voltage VBL may be applied to the control line LA. Accordingly, the sensing bit line SBL and the complementary sensing bit line SBLB may rise to a predetermined voltage (e.g., VINTA-Vthp, where Vthp is a threshold voltage of the first P-type transistor PM1 or the second P-type transistor PM2). In this case, a high level may be applied to the word line WL. The word line WL may maintain a high level during the bit line sensing operation.

According to an embodiment, in operation S230, the bit line sense amplifier 1230 may perform a first sensing operation. For example, in the first sensing period SEN1 of FIG. 10, the third switching signal P3 may be changed to a low level. Accordingly, the sensing bit line SBL and the complementary sensing bit line SBLB may be separated from each other. The second internal voltage VSS less than the precharge voltage VBL may be applied to the complementary control line LAB. In this case, the voltage of the sensing bit line SBL and the voltage of the complementary sensing bit line SBLB may have different voltage values based on the N-type sense amplifier (e.g., the first N-type transistor NM1 or the second N-type transistor NM2). In this case, the sensing ratio of the N-type sense amplifier may occupy a first sensing ratio Vs_n (e.g., 90%). The sensing ratio of the P-type sense amplifier may occupy a second sensing ratio Vs_p (e.g., 10%). For example, the first sensing ratio Vs_n may be the same as the third offset compensation ratio Voc_n2 during the offset compensation operation in FIG. 5. The second sensing ratio Vs_p may be the same as the fourth offset compensation ratio Voc_p2 during the offset compensation operation in FIG. 5.

According to an embodiment, in operation S240, the bit line sense amplifier 1230 may perform a second sensing operation. For example, in the second sensing period SEN2 of FIG. 10, the second switching signal P2 may be changed to a high level. Accordingly, the bit line BL and the complementary sensing bit line SBLB may be connected. The complementary bit line BLB and the sensing bit line SBL may be connected. Accordingly, the bit line BL may increase (or decrease) to the voltage level of the complementary sensing bit line SBLB. The complementary bit line BLB may increase (or decrease) to the voltage level of the sensing bit line SBL.

According to an embodiment, in operation S250, the bit line sense amplifier 1230 may output data sensed by the second sensing operation. For example, after the first sensing period SEN1, the bit line sense amplifier 1230 may be connected to the data line and may output the data to the input/output circuit 1240 of FIG. 2 through the data line. After the second sensing period SEN2, the input/output circuit 1240 may acquire a final data value from the bit line sense amplifier 1230.

According to an embodiment, the bit line sense amplifier 1230 may precharge the sensing bit line SBL and the complementary sensing bit line SBLB to a voltage greater than the precharge voltage VBL in operation S220, and accordingly, in operation S230, a pre-sensing operation may be performed such that the sensing ratio of the P-type sense amplifier occupies 10% or less. In this manner, the sensing efficiency of the bit line sense amplifier 1230 may be improved. In addition, the sensing ratio of the N-type sense amplifier to the P-type sense amplifier in the bit line sensing operation of FIG. 10 may be matched with the offset compensation ratio of the N-type sense amplifier to the P-type sense amplifier in the offset compensation operation of FIG. 5, so that the sensing efficiency of the bit line sense amplifier 1230 may be improved.

Figure 15:
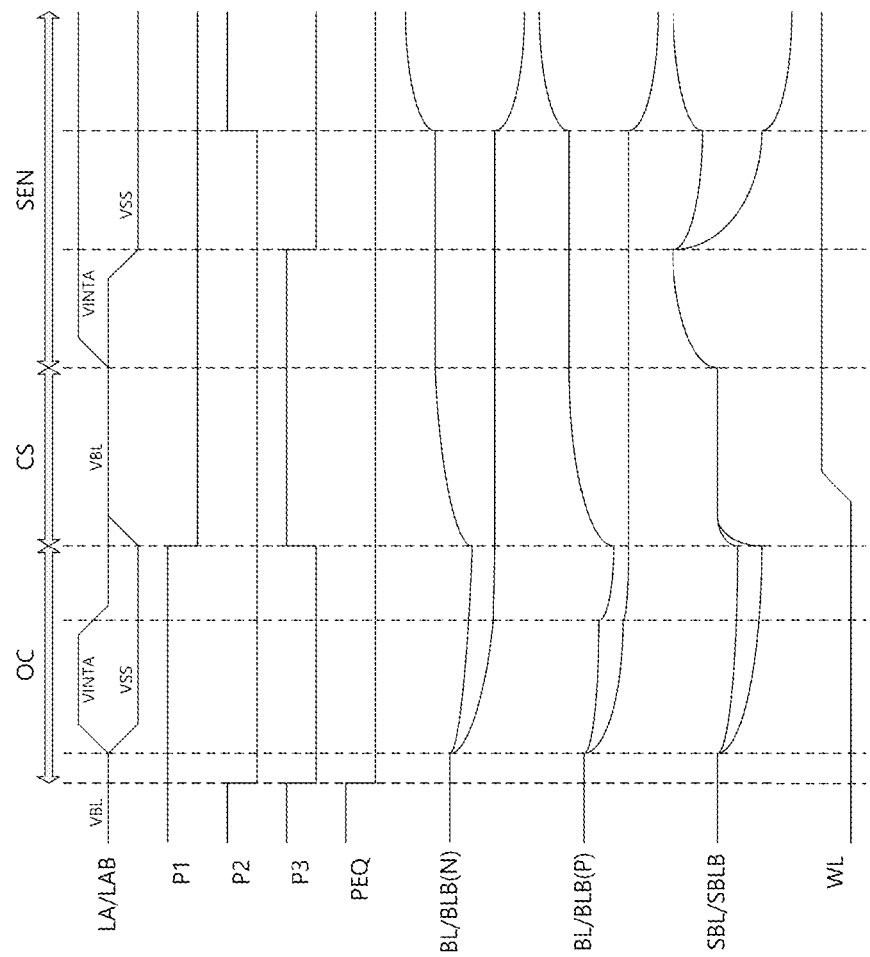
FIG. 15 is a timing diagram illustrating a bit line sensing method of a memory device, according to an embodiment of the inventive concept.

FIG. 15 is a timing diagram illustrating a bit line sensing method of a memory device, according to an embodiment. Referring to FIGS. 2 to 15, the memory device 1200 may compensate for the offset voltage between the bit line BL and the complementary bit line BLB through the bit line offset compensation operation, and may accurately read data stored in the memory cell by performing the bit line sensing operation.

According to an embodiment, in an offset compensation period OC, the bit line sense amplifier 1230 may measure the offset voltage between the bit line BL and the complementary bit line BLB based on the bit line offset compensation method of FIG. 5. In a charge sharing period CS, the precharge voltage VBL may be applied to the control line LA and the complementary control line LAB. The third switching signal P3 may be changed to a high level so that the sensing bit line SBL and the complementary sensing bit line SBLB may be connected to each other. Accordingly, the sensing bit line SBL and the complementary sensing bit line SBLB may be changed to the precharge voltage VBL. In this case, the word line WL is changed to a high level, and charge sharing may occur between the charges stored in the cell capacitor CC of the memory cell MC and the charges stored in the bit line BL. In a sensing period SEN, the bit line sense amplifier 1230 may sense the voltage of the bit line BL based on the bit line sensing method of FIG. 10.

According to an embodiment, through the first offset compensation operation and the second offset compensation operation in the offset compensation period OC, the N-type sense amplifier may have the third offset compensation ratio Voc_n2 (e.g., 90%), and the P-type sense amplifier may have the fourth offset compensation ratio Voc_p2 (e.g., 10%). Meanwhile, in the sensing period SEN, the N-type sense amplifier may have the first sensing ratio Vs_n (e.g., 90%), and the P-type sense amplifier may have the second sensing ratio Vs_p (e.g., 10%). In this case, the third offset compensation ratio Voc_n2 may be the same as the first sensing ratio Vs_n, and the fourth offset compensation ratio Voc_p2 may be the same as the second sensing ratio Vs_p. Accordingly, since the sensing ratio of the N-type sense amplifier is high and the offset compensation ratio and the sensing ratio between the N-type sense amplifier and the P-type sense amplifier are the same, the sensing performance of the bit line sense amplifier 1230 may be improved.

According to various embodiments, the order of the offset compensation period OC and the sensing period SEN may be changed. For example, the sensing period SEN may be performed before the offset compensation period OC.

Figure 16:
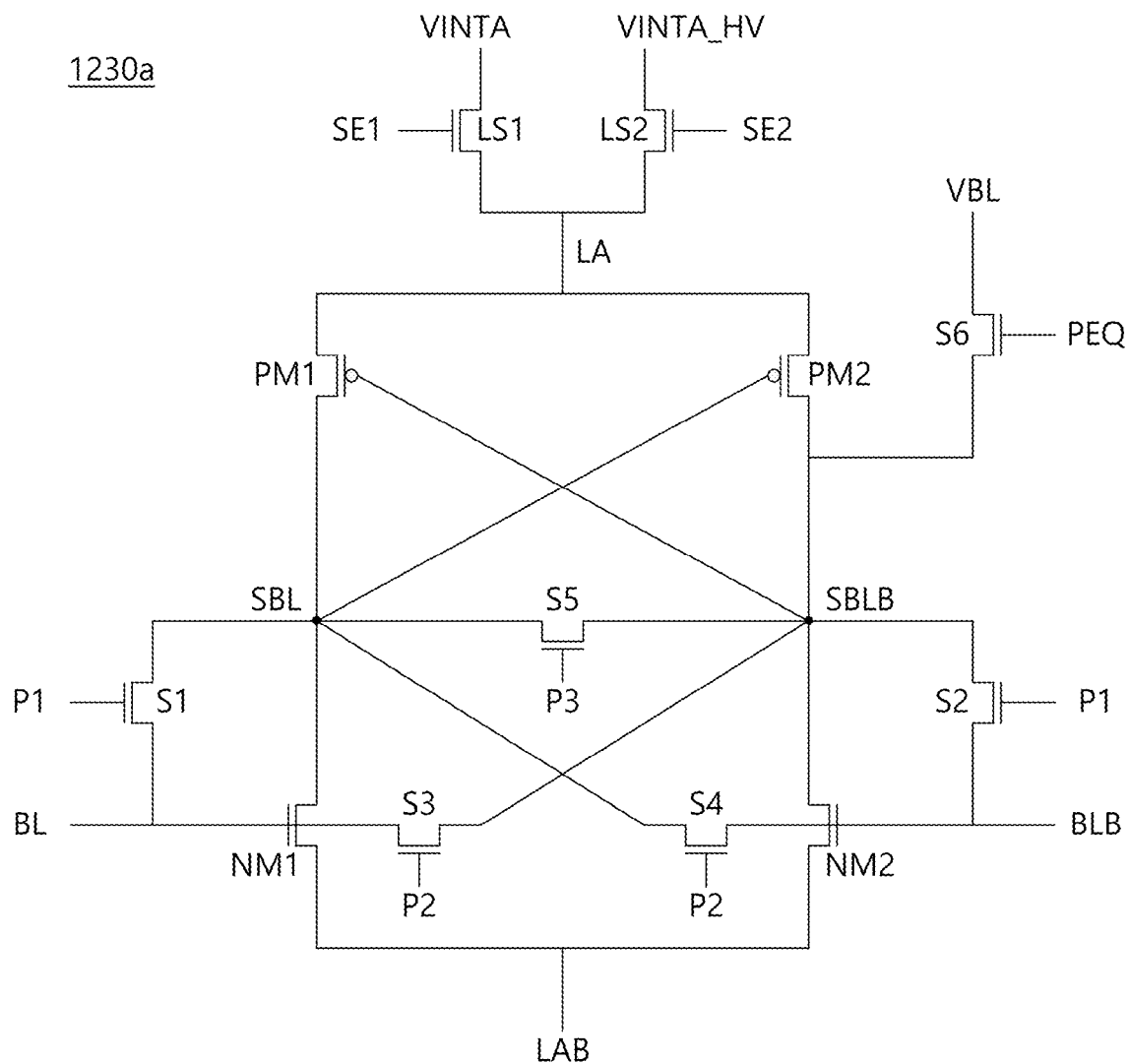
FIG. 16 is a diagram illustrating another embodiment of a bit line sense amplifier of FIG. 2.

FIG. 16 is a diagram illustrating another embodiment of a bit line sense amplifier of FIG. 2. Referring to FIG. 16, most components of a bit line sense amplifier 1230a may be the same as or similar to those of the bit line sense amplifier 1230 of FIG. 4. A description of the same or similar components as those of the bit line sense amplifier 1230 of FIG. 4 will be omitted to avoid redundancy.

According to an embodiment, the bit line sense amplifier 1230a may apply two types of internal voltages to the control line LA. For example, a first power switching transistor LS1 and a second power switching transistor LS2 may be connected in parallel to the control line LA. The first power switching transistor LS1 may transfer the first internal voltage VINTA to the control line LA based on a first power switching signal SE1. The second power switching transistor LS2 may transfer a second internal voltage VINTA_HV greater than the first internal voltage VINTA to the control line LA based on a second power switching signal SE2. Accordingly, the bit line sense amplifier 1230a may selectively apply the second internal voltage VINTA_HV having relatively high voltage in the high level precharge period H_PRE during the sensing operation of FIG. 10. When the second internal voltage VINTA_HV greater than the first internal voltage VINTA is applied in the high level precharge period H_PRE, the sensing ratio of the P-type sense amplifier may be further lowered in the first sensing period SEN1. Accordingly, the sensing efficiency of the bit line sense amplifier 1230a may be improved more than that of the bit line sense amplifier 1230 of FIG. 4.

Figure 17:
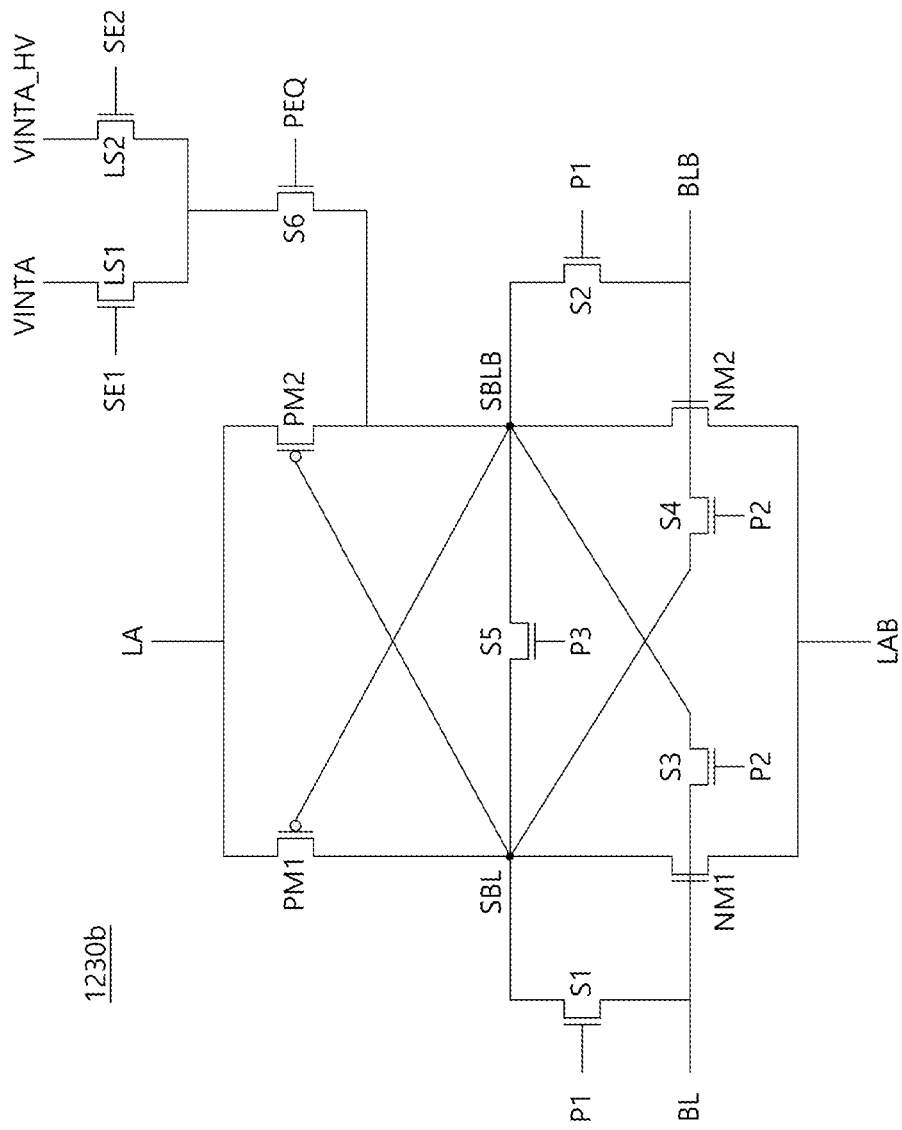
FIG. 17 is a diagram illustrating another embodiment of a bit line sense amplifier of FIG. 2.

FIG. 17 is a diagram illustrating another embodiment of a bit line sense amplifier of FIG. 2. Referring to FIG. 17, most components of a bit line sense amplifier 1230b may be the same as or similar to those of the bit line sense amplifier 1230 of FIG. 4. A description of the same or similar components as those of the bit line sense amplifier 1230 of FIG. 4 will be omitted to avoid redundancy.

According to an embodiment, the bit line sense amplifier 1230b may apply two types of internal voltages through the complementary sensing bit line SBLB. For example, the first power switching transistor LS1 and the second power switching transistor LS2 may be connected in parallel to the sixth switching transistor S6. The first power switching transistor LS1 may transfer the first internal voltage VINTA to the sixth switching transistor S6 based on the first power switching signal SE1. The second power switching transistor LS2 may transfer the second internal voltage VINTA_HV greater than the first internal voltage VINTA to the sixth switching transistor S6 based on the second power switching signal SE2. The sixth switching transistor S6 may transfer the first internal voltage VINTA or the second internal voltage VINTA_HV to the complementary sensing bit line SBLB based on the equalization signal PEQ. Accordingly, the bit line sense amplifier 1230b may selectively apply the second internal voltage VINTA_HV having relatively high voltage in the high level precharge period H_PRE during the sensing operation of FIG. 10. When the second internal voltage VINTA_HV greater than the first internal voltage VINTA is applied in the high level precharge period H_PRE, the sensing ratio of the P-type sense amplifier may be lowered in the first sensing period SEN1. Accordingly, the sensing efficiency of the bit line sense amplifier 1230b may be improved more than that of the bit line sense amplifier 1230 of FIG. 4.

According to an embodiment of the present disclosure, an offset compensation of the bit line sense amplifier in the memory device may be efficiently performed. In addition, data sensing may be accurately performed by the bit line sense amplifier of the memory device.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. In a bit line sense amplifier including: (i) an N-type sense amplifier connected to a bit line and a complementary bit line, and (ii) a P-type sense amplifier connected to the N-type sense amplifier through a sensing bit line and a complementary sensing bit line, a method of operating the bit line sense amplifier to support offset compensation, comprising:

performing a normal precharge operation by charging the bit line, the complementary bit line, the sensing bit line, and the complementary sensing bit line to a precharge voltage;

performing a first offset compensation operation by: (i) connecting the bit line to the sensing bit line, (ii) connecting the complementary bit line to the complementary sensing bit line, (iii) applying a first internal voltage greater than the precharge voltage to the P-type sense amplifier, and (iv) applying a second internal voltage less than the precharge voltage to the N-type sense amplifier;

performing a second offset compensation operation by applying the precharge voltage to the P-type sense amplifier concurrently with applying the second internal voltage to the N-type sense amplifier; and performing a bit line offset detection operation by: (i) separating the bit line from the sensing bit line, (ii) separating the complementary bit line from the complementary sensing bit line, (iii) connecting the sensing bit line to the complementary sensing bit line, and (iv) applying the precharge voltage to the N-type sense amplifier.

2. The method of claim 1, wherein during the first offset compensation operation, the N-type sense amplifier amplifies according to a first offset compensation ratio of an offset voltage difference between the bit line and the complementary bit line, whereas the P-type sense amplifier amplifies according to a second offset compensation ratio of the offset voltage difference, which is less than the first offset compensation ratio.

3. The method of claim 2, wherein during the second offset compensation operation, the N-type sense amplifier amplifies according to a third offset compensation ratio of the offset voltage difference, which is greater than the first offset compensation ratio, whereas the P-type sense amplifier amplifies according to a fourth offset compensation ratio of the offset voltage difference, which is less than the second offset compensation ratio.

4. The method of claim 3, wherein the fourth offset compensation ratio is 10% or less.

5. The method of claim 1,
wherein the P-type sense amplifier includes:
a first P-type transistor electrically coupled between a control line and the sensing bit line and having a gate electrically connected to the complementary sensing bit line; and
a second P-type transistor electrically coupled between the control line and the complementary sensing bit line and having a gate electrically connected to the sensing bit line; and
wherein the N-type sense amplifier includes:
a first N-type transistor electrically coupled between a complementary control line and the sensing bit line and having a gate electrically connected to the bit line; and
a second N-type transistor electrically coupled between the complementary control line and the complementary sensing bit line and having a gate electrically connected to the complementary bit line.

6. The method of claim 5, wherein the first internal voltage is applied through the control line, and the second internal voltage is applied through the complementary control line.

* * * * *